(12) United States Patent
Scovazzo et al.

(10) Patent No.: US 10,969,124 B2
(45) Date of Patent: Apr. 6, 2021

(54) VACUUM SWEEP DEHUMIDIFICATION SYSTEM

(71) Applicant: University of Mississippi, University, MS (US)

(72) Inventors: Paul Scovazzo, Oxford, MS (US); Anthony Scovazzo, Alexandria, VA (US)

(73) Assignee: UNIVERSITY OF MISSISSIPPI, University, MS (US)

( * ) Notice: Subject to any disclaimer, the term of this patent is extended or adjusted under 35 U.S.C. 154(b) by 202 days.

(21) Appl. No.: 16/130,800

(22) Filed: Sep. 13, 2018

(65) Prior Publication Data

US 2020/0088423 A1    Mar. 19, 2020

(51) Int. Cl.
*B01D 53/26*   (2006.01)
*F24F 3/14*    (2006.01)
*B01D 69/04*   (2006.01)

(52) U.S. Cl.
CPC .............. *F24F 3/14* (2013.01); *B01D 53/26* (2013.01); *B01D 69/043* (2013.01); *B01D 2313/24* (2013.01); *F24F 2003/144* (2013.01); *F24F 2003/1435* (2013.01)

(58) Field of Classification Search
CPC .......... B01D 53/26; B01D 69/043; F24F 3/14
See application file for complete search history.

(56) References Cited

U.S. PATENT DOCUMENTS

| | | | |
|---|---|---|---|
| 3,188,283 A | 6/1965 | Cole | |
| 3,464,186 A | 9/1969 | Hankison et al. | |
| 4,900,448 A | 2/1990 | Bonne et al. | |
| 4,961,759 A | 10/1990 | Taylor | |
| 5,002,590 A * | 3/1991 | Friesen | B01D 53/22 95/52 |
| 5,067,971 A | 11/1991 | Bikson et al. | |
| 5,108,464 A * | 4/1992 | Friesen | B01D 53/22 95/52 |
| 5,118,327 A | 6/1992 | Nelson et al. | |
| 5,259,869 A | 11/1993 | Auvil et al. | |
| 5,837,032 A | 11/1998 | Moll et al. | |
| 5,989,312 A | 11/1999 | Barnhard et al. | |
| 6,036,746 A * | 3/2000 | Scovazzo | B01D 53/22 95/289 |
| 6,151,795 A | 11/2000 | Hoffman et al. | |
| 6,776,820 B2 | 8/2004 | Bikson et al. | |

(Continued)

OTHER PUBLICATIONS

Cochran, Michael, et al. ,Condensing dryers with enhanced dehumidification using surface tension elements. 2009, Applied Thermal Engineering, pp. 723-731.

(Continued)

*Primary Examiner* — Jonathan Miller
(74) *Attorney, Agent, or Firm* — Thomas|Horstemeyer, LLP

(57) ABSTRACT

An apparatus for removing water vapor from a feed gas is provided that comprises a membrane housing, a membrane that divides a first pressure side and a second pressure side of the membrane housing, a feed gas inlet and outlet on the first pressure side, a sweep gas inlet and outlet on the second pressure side, a sweep gas flow regulator, and a pump. In some embodiments the feed gas can be at ambient pressure and a pressure drop across the membrane can be less than about 1 atm.

24 Claims, 11 Drawing Sheets

(56) References Cited

U.S. PATENT DOCUMENTS

| | | | |
|---|---|---|---|
| 6,865,821 B2 | 3/2005 | Merschat | |
| 7,984,568 B2 | 7/2011 | Dittmer et al. | |
| 9,492,795 B2* | 11/2016 | Liu | B01D 63/081 |
| 2002/0104439 A1* | 8/2002 | Komkova | B01D 63/087 |
| | | | 96/4 |
| 2002/0194990 A1 | 12/2002 | Wegeng et al. | |
| 2003/0010205 A1 | 1/2003 | Bikson et al. | |
| 2003/0079368 A1 | 5/2003 | Hoffman | |
| 2003/0153700 A1 | 8/2003 | Wu et al. | |
| 2004/0045187 A1 | 3/2004 | Curry et al. | |
| 2004/0187451 A1 | 9/2004 | Suzuki et al. | |
| 2005/0028399 A1 | 2/2005 | Merschat | |
| 2005/0235826 A1 | 10/2005 | Jensvold et al. | |
| 2006/0021615 A1 | 2/2006 | Kertzman et al. | |
| 2007/0277673 A1 | 12/2007 | Crowder et al. | |
| 2008/0085437 A1* | 4/2008 | Dean | B01D 53/268 |
| | | | 429/413 |
| 2009/0308805 A1 | 12/2009 | Chidambaran et al. | |
| 2010/0170776 A1* | 7/2010 | Ehrenberg | B01D 63/085 |
| | | | 202/168 |
| 2012/0181712 A1* | 7/2012 | Vanderwees | H01M 8/04141 |
| | | | 261/102 |
| 2012/0304862 A1* | 12/2012 | Taylor | F24F 13/28 |
| | | | 96/8 |
| 2014/0157985 A1* | 6/2014 | Scovazzo | B01D 53/22 |
| | | | 95/52 |
| 2014/0238235 A1* | 8/2014 | Liu | B01D 63/084 |
| | | | 95/52 |
| 2015/0083121 A1 | 3/2015 | Fisher et al. | |
| 2016/0158694 A1* | 6/2016 | Ehrenberg | B01D 53/268 |
| | | | 95/52 |
| 2017/0301932 A1* | 10/2017 | Bauer | B01D 63/026 |

OTHER PUBLICATIONS

Air Products, Inc. CACTUS® membrane air dryers. s.I. : http://www.airproducts.com/Products/Equipment/PRISMMembranes/page03.htm, 2010. Product Literature.

Noble, R. and Agrawal, R., Separations research needs for the 21st century. 9, 2005, Industrial and Engineering Chemistry Research, vol. 44, pp. 2887-2892.

Pan, F., et al., P(AA-AMPS)-PVA/polysulfone composite hollow fiber membranes for propylene dehumidification. 2008, Journal of Membrane Science, vol. 323, pp. 395-403.

Sijbesma, H., et al., Flue gas dehydration using polymer membranes. 2008, Journal of membrane science, vol. 313, pp. 263-276.

Scovazzo, Paul. 2010, Testing and evaluation of room temperature ionic liquid (RTIL) membranes for gas dehumidification. Journal of Membrane Science, vol. 355, pp. 7-17.

El-Dessouky, et al., A novel air conditioning system, membrane air drying and evaporative cooling. 2000, Trans IChemE, vol. 78, pp. 999-1009.

Liu, L., et al. The effect of a support layer on the permeability of water vapor in asymmetric composite membranes. 2001, Separation Science and Technology, vol. 36, pp. 3701-3720.

Kneifel, K., et al., Hollow fiber membrane contactor for air humidity control: Modules and membranes. 2006, Journal of Membrane Science, vol. 276, pp. 241-251.

Pan, F., et al., Enhanced dehumidification performance of PVA membranes by tuning the water state through incorporating organophosphorus acid. 2008, Journal of Membrane Science, vol. 325, pp. 727-734.

Perry's Handbook of Chemical Engineering, 8th edition. [book auth.] Perry's. Transport and storage of fluids. New York : McGraw Hill, 2008, pp. 10-58 to 10-60.

Charpin, J., Separation of gases by diffusion and gaseous permeation- Applications of gaseous permeation to the dehdration of national gas. 1990, Revue Roumaine de Chimie, vol. 35, pp. 815-820.

Di Landro, L., Pegoraro, M. and Bordogna, L., Interactions of polyether-polyurethanes with water vapour and water-methane separation selectivity. 1991, Journal of Membrane Science, vol. 64, pp. 229-236.

Lokhandwala, K.A., Nakakatti, S.M. and Stem, S.A. Solubility and transport of water vapor in some 6FDA-based polyimides. 1995, Journal of Polymer Science, Part B: Poly Phys., vol. 33, pp. 965-976.

Feng, H., Zhang, H. and Xu, L. Polymeric membranes for natural gas conditioning. 2007, Energy Sources, Part A, vol. 29, p. 1269.

Scovazzo, Paul, Hoehn, Alex and Todd, Paul. 2000, Membrane porosity and hydrophilic membrane-based dehumidification performance. Journal of Membrane Science, vol. 167, pp. 217-225.

Scovazzo, et al; Hydrophilic Membrane-based humidity control, Journal of Membrane Science, 149, 1998, pp. 69-81.

Woods, Jason, Membrane processes for heating, ventilation, and air conditioning, Renewable and Sustainable Energy Reviews, 33; 2014; pp. 290-304.

Wan , et al. Design and fabrication of hollow fiber membrane modules; Journal of Membrane Science 538 (2017) 96-107.

Scovazzo and Scovazzo. Isothermal dehumidification or gas drying using sweep vacuum sweep dehumidification. Applied Thermal Engineering 50 (2013) 225-233.

Qu, et al. Isothermal membrane-based air dehumidification: A comprehensive review. Renewable and Sustainable Energy Reviews 82 (2018) 4060-4069.

Zhang, et al., "Thermodynamic modeling of a novel air dehumidification system," Energy and Buildings, vol. 37, pp. 279-286, 2005.

D. Kosar, "Dehumidification System Enhancements," ASHRAE Journal, vol. 48, No. 2, pp. 48-58, Feb. 2006.

L. Harriman III and J. Judge, "Dehumidification Equipment Advances," ASHRAE Journal, pp. 22-29, 2002.

Lin, et al., "Dehydration of natural gas using membranes. Part II: Sweep/countercurrent design and field test," J. Membr. Sci., vol. 432, pp. 106-114, 2013.

Wickramasinghe, et al., "Mass transfer in various hollow fiber geometries," J. Membr. Sci., vol. 69, pp. 235-250, 1992.

Vallieres et al., "Vacuum versus sweeping gas operation for binary mixtures separation by dense membrane processes," J. Membr. Sci., vol. 244, pp. 17-23, 2004.

Hao et al., "The effect of sweep uniformity on gas dehydration modules," in Membrane Gas Separation, Y. Yampolskii and B. Freeman, Eds., John Wiley & Sons, Ltd, 2010, pp. 333-352.

Bui, et al., "Experimental and modeling analysis of membrane-based air dehumidification," Sep & Pur Tech, vol. 144, pp. 114-122, 2015.

Metz, et al., "Transport of water vapor and inert gas mixtures through highly selective and highly permeable polymer membranes," J. Membr. Sci., vol. 251, pp. 29-41, 2005.

He, et al., "Theoretical study on concentration polarization in gas separation membrane processes," J. Membr. Sci., vol. 153, pp. 243-258, 1999.

Scovazzo, P., "Testing and evaluation of room temperature ionic liquid (RTIL) membranes for gas dehumidification," J. Membr. Sci., vol. 355, pp. 7-17, 2010.

eCompressedair "Aircel Centrifugal Water Separator" Jun. 25, 2010 p. 1 http://web.archive.org/web/20100625004518/http://www.ecompressedair.com/filtration/centrifugal-separators/aircel-centrifugal-separator.aspx.

Performance of a membrane-based condensate-recovery heat exchanger. Newbold, D.D., et al. Monterey, CA : SAE Technical Paper Series, 1996. 26th International Conference on Environmental Systems. p. SAE Technical Paper 961356.

Wang, et al., Hollow fiber air drying, journal of Membrane Science, 72; 1992; pp. 231-244.

Bui, On the theoretical and experimental energy efficiency analyses of a vacuum-based dehumidification membrane; Journal of Membrane Science 539 (2017) 76-87.

\* cited by examiner

VACUUM SWEEP DEHUMIDIFICATION SYSTEM

CROSS-REFERENCE TO RELATED APPLICATIONS

None.

FIELD OF THE INVENTION

The present invention generally relates membrane dehumidification systems, and more particularly to water permeable membrane systems for dehumidifying gases at ambient pressure. The present invention also relates to membrane systems for dehumidifying gases at ambient pressure that utilize a sweep gas to sweep a permeate side of a membrane.

INTRODUCTION

Air conditioning represents 50% of a buildings energy usage and is critical for productivity, quality, and health. The removal of humidity from air flowing in a HVAC system increases the overall energy efficiency of the system; reducing energy usage, capital costs, and the discharge of harmful greenhouse gases. The relationship between humidity control and building air quality has long been established in ASHRAE standards, with a 30% to 60% relative humidity range being ideal for worker productivity and safety. Current HVAC dehumidification technologies exist in two forms: membrane technologies and non-membrane technologies.

Current non-membrane HVAC technologies utilizing air at atmospheric pressures to control humidity require a multi-step process for dehumidification. These processes typically lack precise control and are energy intensive as they often include a water phase change and a second process to return the gas temperature to the original or another desired temperature. Examples of current HVAC humidity technologies used to control humidity and building comfort are cooling coil systems, desiccant cycle systems, and heat exchangers. Cooling coil systems require an inefficient phase change and suffer from an increased humidity spike back into the permeate when cycling to off, desiccant cycle systems utilize fluorocarbons or other chemicals to dehumidify the air which can be harmful to the user or the environment, and heat exchangers have little to no effect on the humidity of the air.

Membrane based dehumidification systems establish a partial pressure difference across the water permeable membrane by operating the feed and permeate streams at different absolute pressures to create a driving force for the dehumidification process. The benefit of these systems is they can remove water vapor from the feed gas without requiring a phase change. Existing systems generally rely on high pressure feed gas (over 7 Bars) to create an appropriate pressure drop to act as the driving force across the membrane. As a result, these high pressure systems do not function with feed gases at ambient pressure as the pressure drop across the membrane is too low, and attempts to modify these systems into the VSD system produces inefficient pressure drops in the sweep to permeate stream.

With expected energy savings of up to 86%, there has long been an unmet need for dehumidification systems that can dehumidify gases isothermally and efficiently at ambient pressure, with expected energy savings, such as gases in air conditioning systems, dryers, and other HVAC systems. Instead of focusing on the individual membrane as the rate-determining step, VSD instead focuses on the membrane module design to achieve this unmet need.

The process of removing water vapor from gases has a number of names; such as, dehumidification, dehydration, humidity controlled air conditioning, etc. It is an energy intensive and widely needed process in industrial manufacturing and air conditioning. For example, air conditioning, in the United States of America, accounts for 48% of a building's energy consumption. The comfort and health of occupants in a building is a function of both temperature and humidity; however, control systems traditionally use only the temperature as the control parameter. The current health driven focus on actively exchanging portions of building air with outside air has increased the need to dehumidify the treated air more than the need to reduce temperature.

This need for humidity control is a long unmet need that has been identified by ASHRAE since at least 1966. For example "the relative humidity should not exceed 60% at any point in the occupied space . . . ." (ASHRAE Handbook of Fundamentals, 1972, Chapter 33 p 667). ASHRAE (American Society of Heating, Refrigerating and Air-Conditioning Engineers) was founded in 1894 and its handbook and standards are often cited in building codes. Additional reference from ASHRAE is Standard 55-66 (published in 1966). ASHRAE's Thermal Comfort Conditions specify comfort conditions and humidity control in further detail. While control of humidity by overcooling/reheating and by desiccant drying processes has long been applied and understood, both of these methods are energy intensive and hard to control. Therefore, the recommendation for humidity control, from the middle of the last century, is still not widely applied, further indicating an unmet need.

For instance, building occupants are more comfortable if the humidity is controlled within a defined range. This range is generally 30% to 60% relative humidity, but varies slightly with dry bulb temperature and clothing (ASHRAE Standard #55). The economic impact of this comfort is increased worker productivity. Reducing humidity in an occupied space also leads to a cooler feeling. Some occupants overcome the humid feeling by reducing the dry-bulb temperature, but not the humidity, of the space. This is a compromise between feeling too cold rather than too humid, which is uncomfortable but currently widely accepted. Humidity is also an important consideration in manufacturing quality control, particularly when using hygroscopic materials, and avoiding corrosion on machined metal parts.

Worker health can be a significant concern. If humidity is too low, the drying of the mucus membranes reduces the body's immune system. If humidity is too high, environmental mold and mildew growth increase. Therefore, controlling humidity within a narrow range promotes good health practices in the workplace.

In general, the design of an air conditioning system provides the proper balance between sensible cooling and humidity control based on a "standard day" for a particular location. The system controls to a set-point temperature based on the humidity level of the "standard day." There is no measurement of the humidity or control of the process based on humidity. The amount of dehumidification achieved is a function of the run time determined by the temperature controller and often little actual humidity control occurs. This is because the design conditions of the "standard day" occur for only a few hours of each year. During the remaining hours, the temperature and humidity vary with little relation to each other. Often the humidity can be higher than design criteria when the dry-bulb temperature is lower than design criteria. When this occurs the humidity within a space may rise significantly.

Currently, three different technologies are typically utilized for humidity and building comfort control: coiling coil (reheat cycle), desiccant drying, and humidity exchanger.

The most common of the currently applied technologies to humidity control is the reheat cycle utilizing a coiling coil. In this process, a cold coil, which may be finned, is placed in the gas stream. The temperature of the coil must be slightly below the desired dew point temperature of the dehumidified gas. Humidity condenses out of the gas onto the cold surface of the coil. The gas stream leaving the coil is at the desired dew point temperature, and the dry bulb temperature is only slightly above the dew point temperature. The gas must then be heated to the desired dry bulb temperature. This reheating of the gas represents an additional energy penalty required to dehumidify the gas. A conventional Vapor Compression Refrigeration Cycle (VCC) could produce cool coils and could also supply the reheat energy.

The second technology uses a desiccant drying system. This process removes humidity from the air mass but increases the temperature of the air mass. In the first step, the desiccant, exposed to the humid gas, adsorbs the humidity from the gas. This is an exothermal step, so the gas heats up as the water vapor absorbs. Before this gas can be used it must then be cooled to the desired delivery temperature. In the second step, high grade heat regenerates the desiccant. Heating the desiccant increases the surface vapor pressure above the vapor pressure of the surrounding gas, and the moisture leaves the desiccant. The third step is to cool the desiccant so that its water vapor pressure will be below the vapor pressure in the processed gas. Energy is therefore used in both cooling the air after the desiccant step and in the regeneration step. The overheated air is then re-cooled to the desired condition. In either of these first two technologies, energy is wasted moving along the temperature scale for water vapor removal only to move back toward the original temperature of the air mass for comfort or health. The use of water phase change as the dehumidification mechanism dictates this movement along the temperature scale. Phase change is not the mechanism in the present invention.

The third technology is to use a humidity exchanger between the process air and waste air stream. This is usually a heat wheel coated with a desiccant, but a few plate type humidity exchangers are available and several liquid desiccant systems are also in use. This process does not serve as humidity control because it will not result in the removal of all the water vapor required. It is used as a pretreatment to humidity control and is effective in reducing the energy cost of humidity control in some climates but not all regions of the world.

Membrane humidity control systems can remove humidity without a water vapor phase change. In contrast, the current building air conditioning market depends on a phase change; such as, condensation (cooling coils), absorption (LiCl solutions), or adsorption. These non-membrane systems must pay this phase change energy cost either through regeneration (absorption/adsorption) or electricity to run a vapor compression refrigeration cycle (VCC). While all three of these technologies are inherently non-isothermal, their energy efficiency can be increased by recycling thermal energy or by combining multiply technologies into hybrid systems.

A number of membrane systems in the literature are variations on the existing technologies; namely, cooling coil and absorption. Membrane manifestations of the cooling coil, or "membrane condensers," have been used for humidity control in microgravity environments and proposed as a means to improve the efficiency of condenser (clothes) dryers. While these are novel applications of membrane technologies, these "membrane condensers" still dehumidify air by cooling it and give no practical advantage for air conditioning over standard cooling coil technology. Membrane manifestation of absorption may use aqueous salt solutions; such as LiCl (10). These membrane systems are variations on the existing desiccant cycles. The membrane serves only as a method of contacting the humid air with the desiccant.

Membrane systems for the dehumidification of gas streams have previously been proposed for natural gas, ethanol, and compressed gas. In the context of compressed gas, the humid feed gas is generally at pressures greater than 100 psia (7 bars). However, in the context of membrane systems with the humid feed gas at standard atmospheric pressures ($\approx$1 bar), the literature and research is limited. Bend Research and Kneifel et al. have previously looked at designing membrane modules for dehumidifying air that have proper mass transfer capabilities and minimum treated gas pressure drops. The Kneifel et al. system used an aqueous salt flowing on the permeate side of the membrane to establish the driving force for the humidity mass transfer via absorption. El-Dessouky et al. did a paper study and simulation of the energy savings of adding a membrane-based dehumidifier without a recycle sweep in the permeate, prior to sensible heat removal via evaporative cooling in an integration air conditioning system. El-Dessouky et al.'s conclusion was that such a design could lead to an 86% energy saving compared to using only a conventional coiling coil system (e.g., a vapor compression refrigeration cycle). These estimated savings indicate that there is a potential for energy savings with embodiments of the present invention.

A membrane process establishes a partial pressure difference across the membrane by operating the feed and permeate streams at different absolute pressures. For instance, compressed air systems use a feed stream that is $\geq$100 psig while operating the permeate stream at ambient pressures. Alternatively, one could try to use feed gas at ambient pressure and attach a vacuum pump to the permeate. For humidity controlled air conditioning systems the former is impractical and the later results in a very small driving force, $\Delta F$. For example, if a vacuum permeate membrane system has a high water selectivity then the vacuum pump attached to the permeate stream must maintain an absolute pressure of less than 12 mmHg (0.232 psia or 29.45 inHg of vac) for practical air conditioning results.

In discussing membrane technologies, we must first distinguish between enthalpy exchange and humidity control. A number of membrane enthalpy exchangers are already available in the market. These exchangers cannot control humidity but only lower the load on the build's humidity control system. The analogy is that a heat exchanger between vented and make-up air will not eliminate the need for a heater during cold weather.

Several patent documents specify a compressed or pressurized gas feed with a portion of the retentate used as a permeate sweep. The following are representative of these high pressure feed patents: U.S. Pat. No. 6,540,818, describing compressed air feed, retentate "reflux" as sweep; U.S. Pat. No. 5,259,869, describing pressurized feed, retentate sweep, no specification on permeate pressure; U.S. Pat. Nos. 4,793,830 and 4,687,578, describing feed "compressed to at least one atmosphere" with an ambient pressure retentate sweep. Thus, high pressure membrane systems exist for dehumidifying industrial gases. Some of these units recycle a portion of the produced gas to aid in establishing the driving force for the dehumidification process. These industrial membrane systems operate with a cross membrane pressure drop of greater than 6.5 atmospheres.

The following patents are also of note, as representations of the state of the art: U.S. Pat. No. 4,718,921, limited to hollow filaments made of aromatic imide polymer with retentate sweep, and preferably having pressurized gas feeds and ambient permeate pressures made in the retentate sweep claim; U.S. Pat. No. 4,900,448, limited to hollow fiber membranes and vacuum only with no vacuum retentate sweep; U.S. Pat. No. 5,681,368, limited to pressurized feed and vacuum permeate with no retentate sweep; U.S. Pat. No. 5,525,143, limited to hollow fiber membranes with internal module sweep gas generation; U.S. Pat. No. 4,783,201, using "sufficiently porous membranes" to create the retentate sweep via "leaking membranes."

U.S. Pat. No. 5,259,869 by Auvil et al. describes a system which utilizes a membrane for drying gas streams containing water vapor. However, Auvil et al. incorporates a pressurized air stream. See col. 4, lines 29-40. Additionally, fails to disclose or suggest gas flows that are cross current or substantially perpendicular to the membrane.

U.S. Pat. No. 5,108,464 by Friesen et al. likewise discloses a pressurized feed and as a result teaches away from the present invention. Additionally, Friesen et al. disclose a flow configuration that fails to disclose or suggest the perpendicular or cross current flow across a membrane that is used in the present invention.

FIG. 1 also shows a typical prior art, pressurized system, with the feed gas entering the chamber parallel to the membrane.

Proposals to use membrane systems for humidity control date back to before October 2000, when El-Dessouky et al. published a study that a successfully designed membrane air drying system could result in 86.2% energy savings over commonly used conventional mechanical vapor compressor air conditioners. However, to date no such system is available in the market, indicating an unmet need with a significant commercial value potential.

Accordingly, there remains a long-felt but unmet need for systems that can dehumidify gases isothermally. Additionally, there remains a need for cost-effective and efficient dehumidification of gases that are at about ambient pressure, such as gases in air conditioning units and dryers. There also remains a need for a membrane dehumidification unit that can remove water vapor from gases with a relatively low pressure drop (e.g., less than about 6.5 atm) across the membrane.

One reason the need has remained unmet for vacuum sweep dehumidification (VSD) for applications reducing humidity and improving building air conditioning is the lack of optimized membrane module design. Since the operating conditions for VSD can differ significantly from the typical membrane gas separation process the resulting membrane module design can be significantly different than a typical hollow-fiber module.

Existing membrane humidity control systems, based on the FIG. 1, for example, already control humidity in high pressure feed gas systems such as the PRISM Cactus® for compressed air and MTR's system for natural gas drying. However, the implementation of a vacuum sweep dehumidification (VSD) system for z 1 bar absolute pressure feeds has been, until recently, "taught away" by the patent and scientific literature. The VSD systems of the present inventions are easier to implement (less feed-back piping, etc.) than the hybrid humidity control systems already on the market. This ease of implementation would open up markets where the economy of scale is a barrier to hybrid systems, for example residential homes, as well as compete within the commercial property market.

Thus, the present invention meets these long-felt needs.

SUMMARY OF THE INVENTION

This Summary lists several embodiments of the presently invention, and in many cases lists variations and permutations of these embodiments. This Summary is merely exemplary of the numerous and varied embodiments. Mention of one or more representative features of a given embodiment is likewise exemplary. Such an embodiment can typically exist with or without the feature(s) mentioned, likewise, those features can be applied to other embodiments of the presently disclosed subject matter, whether listed in this Summary or not. To avoid excessive repetition, this Summary does not list or suggest all possible combinations of such features.

Embodiments of the present invention include apparatuses and methods for removing water vapor from a gas. Embodiments of the present invention use a membrane process for humidity control that is substantially different than the technologies currently used for humidity control and that resolve the above-discussed unmet needs.

In some embodiments, the present invention relates to an apparatus for removing water vapor from gas, comprising an apparatus that includes: a membrane housing having a feed gas end and a retentate end. The membrane housing comprises a sweep in manifold, a sweep out manifold, a membrane, a feed gas pressure zone, a sweep gas in pressure zone, and a sweep gas out pressure zone. The sweep in manifold and the sweep out manifolds are generally parallel to the feed gas flow and hold the membrane generally perpendicular or in a cross current configuration to the feed gas flow; and wherein the sweep in manifold defines the sweep gas in pressure zone and the feed gas pressure zone and the sweep out manifold defines the sweep gas out pressure zone and the feed gas pressure zone; a feed gas inlet directing a feed gas with a first humidity through the feed gas pressure zone to perpendicularly contact and cross the membrane, to the retentate end; a feed gas outlet on the retentate end; a sweep gas inlet directing a sweep gas with a second humidity into the sweep gas in pressure zone, through the membrane, and to the sweep gas out pressure zone; a sweep gas outlet in the sweep gas out pressure zone, allowing the permeate to exit the membrane housing; a sweep gas flow regulator to direct the sweep gas into the sweep gas in pressure zone; and a sweep gas outlet vacuum pump located downstream from the sweep gas outlet that imparts a lower pressure in the sweep gas out pressure zone than the pressure in the sweep gas in pressure zone and the feed gas pressure zone; wherein water vapor from the feed gas is drawn through the membrane into the second pressure space as the permeate.

In some embodiments of the present invention, the fibers are potted in rectangular layers with the housing, and the fiber spacing is about 4 fibers per cm that blocked 26% of the cross section area of the feed to retentate flow path, with the cross-sectional void space of about 75% or less. In other embodiments, the void space is about 50-75%. Herein this is also referred to as intermembrane fractional spacing, a measurement of open flow area/total area. In some embodiments, the fractional spacing is greater than 0.5. In other embodiments, the fractional spacing is greater than about 0.6. In other embodiments, the fractional spacing is from about 0.5 to about 0.75. In other embodiments, it is about 0.6 to about 0.75. In other embodiments, it is about 0.6 to about 0.9.

With respect to pressures, the sweep gas experiencing a pressure drop of 20-40 mmHg. The permeate may have pressures of 50-100 mmHg. Additionally, the pressure feed is at ambient pressure. Typically, the pressure drop from feed to retentate stream is about <0.06 kPa. In some embodiments, the pressure drop from feed to retentate is about 0.0025 to about 0.02 kPa.

In embodiments of the present invention, the sweep rate is about 10% or less. Above a 10% sweep rate, product loss and pump work becomes more significant while the optimal driving force profile through the membrane module probably occurs at ≈10% sweep rate. Uniform distribution of the sweep should not be a critical design element of the membrane module; however, the ability to control the sweep rate would allow the VSD to respond to changing humidity in the feed, a design concern common to air condition systems.

Some embodiments of the present invention further comprise a water collection device to collect condensed water vapor from the feed gas, and the water collection device can be attached to the second pressure side of the membrane housing and/or be downstream of the sweep gas outlet.

In some embodiments the apparatus further comprises a flow splitter to direct a re-directed portion of the retentate exiting the first pressure side to the second pressure side as the sweep gas. The re-directed portion can be about 0.1% to about 99.9%, about 0.1% to about 50%, or about 0.1% to about 20% of the gas exiting the feed gas outlet, for example.

In some embodiments of the apparatus, a pressure in the second pressure side is lower than a pressure in the first pressure side. In some embodiments the feed gas enters the first pressure side at ambient pressure. Also, in some embodiments a pressure in the second pressure side is about 200 mmHg-absolute or less, about 100 mmHg-absolute or less, or about 50 mmHg-absolute or less.

With respect to pressures, the sweep gas experiencing a pressure drop of 20-40 mmHg. The permeate may have pressures of 50-100 mmHg. Additionally, the pressure feed is at ambient pressure. Typically, the pressure drop from feed to retentate stream is about <0.06 kPa. In other embodiments, the pressure drop ranges from about 0.025 to about 0.3 kPA.

Some embodiments of the present invention can achieve feed gas in the feed gas outlet having a dew point of about −42° C. to about 35° C., and can have dehumidification performance of about 50% to about 600%.

The feed gas may be air, oxygen, nitrogen, methane, biomethane, ethane, ethylene, ethanol, butane, butanol, or combinations thereof. Additionally, the sweep gas includes air, a portion of the feed gas from the feed gas outlet, a separate gas from the feed gas, gas held in a separate container, or combinations thereof. Further, the sweep gas comprises a recycled portion of the feed gas.

In embodiments of the present invention, the feed gas enters the first pressure space at ambient pressure.

Some embodiments of the present invention further comprise a water collection device to collect condensed water vapor from the feed gas, and the water collection device can be attached to the second pressure side of the membrane housing and/or be downstream of the sweep gas outlet.

The membrane in some embodiments is a spiral wound membrane, a tubular membrane, a hollow fiber membrane, a flat sheet membrane, a capillary membrane, or combinations thereof. The membrane can be a water permeable membrane, a semi-permeable membrane, or combinations thereof, and specific examples of membranes comprise polydimethylsiloxane, cellulose acetate, sulfonated polyethersulfone, polyethylene oxide, sulfonated poly(ether ether ketone), poly(vinylalcohol)-EDTMPA, [emim][Tf$_2$N], [N(4)111][Tf$_2$N], [emim][BF$_4$], or combinations thereof.

As defined herein, hollow fibers, or membrane tubes, can include capillary tubes. In embodiments of the present invention, the fibers have a diameter of less than 0.5 mm. In other embodiments of the invention, the fibers/membrane tubes have a diameter of about 0.5 mm to about 5 mm.

Some embodiments further comprise a recycle loop that is in fluid communication with the feed gas inlet and wherein the feed gas outlet or a recycle loop that is in fluid communication with the sweep gas outlet and the feed gas inlet. The recycle loop can connect a gas outlet of a water collection device to the feed gas inlet in some embodiments.

Some embodiments are part of a heating system, a ventilation system, an air conditioning system, a drying system, a liquid recovery system, or combinations thereof. For example, the feed gas in the feed gas outlet can enter a drying system. Also, a dryer gas from an outlet of the drying system is recycled to the feed gas inlet in some embodiments.

Embodiments of the present invention also comprise a method for manufacturing the above described embodiments of the present invention as well as variations thereof. Furthermore, other embodiments comprise methods for removing water vapor from gas comprising providing an embodiment of the present invention described above as well as variations thereof, delivering the feed gas to the feed gas inlet, vacuuming the second pressure side with the pump to provide the sweep gas to the second pressure side and drive water vapor through the membrane, and collecting a product.

In some embodied methods the product is the feed gas from the feed gas outlet, water vapor collected from a water collection device, or combinations thereof.

In some embodiments the feed gas that is to have water vapor removed is air, oxygen, nitrogen, methane, biomethane, ethane, ethylene, ethanol, butane, butanol, or combinations thereof. In some embodiments the sweep gas is a portion of the feed gas from the feed gas outlet, a preselected gas, or combinations thereof.

In some embodiments the feed gas enters the first pressure side at ambient pressure and the sweep gas comprises a portion of the feed gas.

Embodiments of the present invention also comprise a plurality of the above described embodiments of apparatuses as well as variations thereof, wherein the plurality of apparatuses are connected together to establish concurrent flow, countercurrent flow, cross-flow flow, or combinations thereof.

Other embodiments of the present invention include methods for removing water vapor from gas. These methods utilize an apparatus for removing water vapor described herein. The methods of the present invention include directing a feed gas at ambient pressure with a first humidity into the first pressure space to perpendicularly contact with the membrane; directing a sweep with a second humidity into the sweep gas in pressure zone, through the membrane, and to the sweep gas out pressure zone; vacuuming the sweep gas out pressure zone to create a permeate in the sweep gas out pressure zone; and drawing the permeate out of the membrane housing.

In embodiments of the present invention, the feed gas enters the first pressure space at ambient pressure. In embodiments of the present invention, ambient pressure feeds are defined as gas feeds ranging from about −0.2 bars (2.9 psig) to +0.2 bars (2.9 psig).

Accordingly, one aspect of the present invention is a vacuum sweep dehumidification device.

Another aspect of the present invention is an air conditioning system that incorporates a vacuum sweep dehumidification device of the present invention.

Another aspect of the present invention is a clothes dryer that incorporates a vacuum sweep dehumidification device of the present invention.

Further advantages of the presently-disclosed subject matter will become evident to those of ordinary skill in the art after a study of the description, figures, and non-limiting Examples in this document.

DESCRIPTION OF EXEMPLARY EMBODIMENTS

Figure 1:
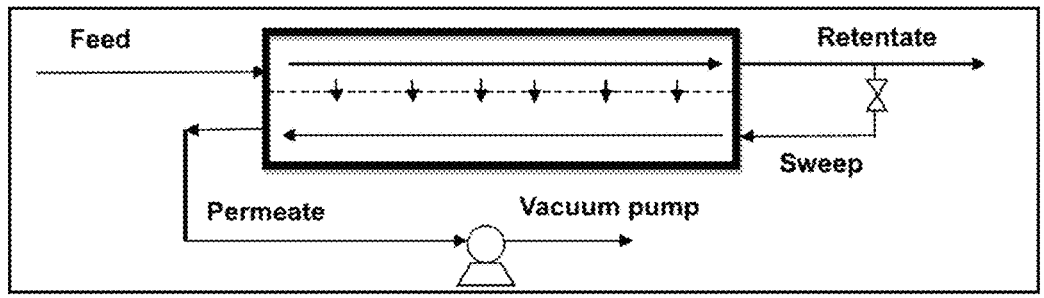
FIG. 1 shows a prior art membrane dehumidification system.

Embodiments of the present invention generally relate to a membrane-based dehumidifying system and methods for using and implementing the system. In some embodiments the membrane system can use a fraction of the dehumidified gas as "a dehumidifying working fluid" (e.g., sweep gas) that passes through a sweep gas flow regulator prior to reenter the membrane housing. Without being bound by theory or mechanism, the combination of gas expansion and low absolute pressure sweep gas establish a driving force strong enough to achieve dehumidification efficiencies, defined as the ratio of latent heat removed to the energy consumed, greater than about 200%. Notably, in some embodiment the driving force is sufficient such that gas at ambient pressure can be dehumidified, and therefore the pressure drop across the membrane is at most about 1 atm. The produced gas can have a lower humidity than the feed gas. Some embodiments of the present invention produce gases with dew points less than about 0° C.

In the following description, various embodiments of the present invention will be disclosed. For purposes of explanation, specific numbers and/or configurations are set forth in order to prove a thorough understanding of the embodiments. However, it will also be apparent to one skilled in the art that the embodiments may be practiced without one or more of the specific details, or with other approaches and/or components. In other instances, well-known structures and/or operations are not shown or described in detail to avoid obscuring the embodiments. Furthermore, it is understood that the embodiments shown in the figures are illustrative representations and are not necessarily drawn to scale.

References throughout this specification to "one embodiment," "an embodiment," and so forth mean that a particular feature, structure, or characteristic described in connection with the embodiment is included in at least one embodiment. Thus, references to certain "embodiments" and so forth throughout this specification are not necessarily all referring to the same embodiment. Furthermore, the particular features, structures, or characteristics may be combined in any suitable manner in one or more embodiments.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "perpendicular" or "generally perpendicular means an angle of about 90 degrees, plus/minus 60 degrees. For example, where the feed gas contacts the membrane perpendicularly, or generally perpendicularly, the feed gas contacts the membrane at approximately a 90 degree angle. However, the angle can vary from about 30 degrees to about 150 degrees.

As used herein, the term "parallel" or "generally parallel" means the same plane, plus or minus about 30 degrees.

As used herein, the term "cross current" means air flow a perpendicular or generally perpendicular angle.

Some embodiments of the present invention are a low energy system for direct humidity control. Such embodiments directly meet long-felt needs that are not met with current commercially available technologies. Embodiments of the present invention remove humidity from gases in ways that are thought to be unattainable with conventional cooling coil dehumidification; namely, for example, isothermal dehumidification and the production of gases with dew points <0° C.

Some embodiments of the present invention use a portion of the retentate expanded through a sweep gas flow regulator (e.g., controllable valve) to create the desired combination of vacuum pressure and sweep gas flow rate. These embodiments dehumidify the feed gas, which then becomes the retentate. Alternative embodiments use the resulting spent sweep gas to produce liquid water that may or may not be potable.

Embodiments of the present invention include a technology that dehumidifies gases with low energy use that could garner significant market share from existing heating, ventilation, and air conditioning atmospheric pressure technologies (e.g. cooling coils and desiccants) and drying systems.

Some embodiments of the present invention are directed to systems and processes to increase the energy efficiency of drying systems. Drying systems include clothes dryers, dryers used for pharmaceutical manufacturing, and the like. Further, some embodiments can isothermally dehumidify the exit gases from a dryer, and this dehumidified exit gas can then be recycled to the dryer to achieve direct recycling of the sensible heat to the dryer.

Specific examples of economic impacts of embodiments of the present invention, due to its ability to reduce humidity, used in clothes drying systems include reduced bedding and linen replacement for hotels. Because clothes dryers currently account for about 5.8% of household energy use in a process recognized as being energy inefficient (1), those of ordinary skill will recognize the energy and cost advantages that may be achieved with certain embodiments of the present invention.

Specific examples of economic impacts of embodiments of the present invention, due to its ability to reduce humidity, used in pharmaceutical and material drying systems allow for better humidity control for pharmaceutical manufacturing and packaging operations, which is also important for quality control during production and for shelf life during storage and packaging.

Furthermore, some embodiments of the claimed subject matter are also capable of recovering gaseous water as a liquid (e.g. considering the permeate as the product), and such liquid water may be potable and applicable for humanitarian or military applications. Other non-limiting examples of applications for the present invention could also include defrosting car windows without the need to run the air conditioner, thus saving gas.

Some embodiments of the present invention can be used in conjunction with existing heating, ventilation, and/or air conditioning systems (HVAC systems). Traditionally, in residential and smaller structures temperature control instead of humidity control is the norm. Humidity control using current technologies adds both capital and energy cost because of the need to add a reheat or desiccant system. In the context of air conditioning systems, the invention could remove latent heat from the air prior to cooling via a conventional refrigeration vapor compression cycle (VCC) or evaporative cooling. Air conditioning systems using embodiments of the present invention for latent heat removal can use less energy overall than current VCC alone systems. The decoupling of latent and sensible heats may reduce energy cost of the entire air conditioning system by avoiding over cooling (followed by reheating) of the processed air. Lowering the moisture content of air within a building may also contribute to energy conservation. Low humidity buildings "feel" cooler and direct humidity control can eliminate the need to cool buildings for occupant comfort. Thus, some embodiments of the present invention that are used in conjunction with HVAC systems can reduce the net amount of energy required to make conditions within a structure comfortable. In addition, this may lead to increased public health by reducing the growth of bacteria, mold and mildew. Proper levels of humidity can also boost the body's immune function.

The present invention does not use hydrofluorocarbons (HFCs) and may result in smaller cooling units containing smaller volumes of HFC working fluids since the cooling units will have reduced heat loads (e.g., reduced latent heat leaving only sensible heat loads). HFCs are strong greenhouse gases; therefore, the invention may benefit the public and reduce greenhouse gases in two ways: reduced energy use and reduced production of HFCs.

Thus, benefits of the invention being used in HVAC systems include, for example, increased use of humidity control versus temperature control, smaller refrigerant plants leading to a decrease in the environmental impact of hydrofluorocarbon (HFC) refrigerant gases, less maintenance and cleaning costs, reduced energy consumption costs, and even possible increases in public health.

In the case of air conditioning employing VSD, it is desirable to minimize the total work of the vacuum pump and maximize water vapor removal. The vacuum pump work is related to the sweep rate and the compression ratio. Therefore, minimizing the pump work would result from decreasing the sweep rate and/or increasing the pressure of the permeate at the pump entrance. Since the objective is to dehumidify the feed air, the water removal of interest is absolute humidity reduction from Feed to Retentate streams and can be reported either as g-water/kg-dry air or percent reduction. This objective benefits from maximizing the overall membrane module mass transfer coefficient. As discussed below, the key to optimizing both the pump work and overall mass transfer coefficient is in the fluid dynamics of the membrane module of the present invention.

One of ordinary skill in the art would recognize embodiments of the present invention as having different operational conditions than in prior art membrane applications. With embodiments of the present invention, membrane feeds are at approximately 1 bar absolute pressure. This is significantly lower that prior membrane applications that have feed pressures of greater than 5 bars. The sweep/permeate operating pressures of aspects of the present invention is also typically an order of magnitude smaller than prior membrane modules. Allowable pressure drops in the process streams are also significantly smaller than prior systems. For example, the tolerable pressure drops in building air handling systems are generally <0.06 kPa (0.45 mmHg); we took this to be the design specification for the feed to retentate pressure drop.

One superior and unexpected result of embodiments of the present invention is the size of the driving force for removing humidity from the feed gases. The dew point temperatures of the permeate may indicate the size of this driving force, and in some embodiments the permeate may have a dew point below the freezing point of water. In certain embodiments of the present invention, the permeate dew point was as low as minus 42° C. The conventional cooling coils used in the air conditioning industry physically may not reach driving forces for humidity removal that are this large, since ice formation on the coils sets the minimum dew point for a conventional coil at around 0° C. In addition, the invention may produce dehumidified gases as a product with dew points <0° C. Extremely dry product gases, with dew points <0° C., are typically impossible for convention cooling coils.

Some embodiments achieve dew points of about −42° C., about −40° C., about −35° C., about −30° C., about −25° C., about −20° C., about −15° C., about −10° C., about −5° C., about 0° C., about 5° C., about 10° C., about 15° C., about 20° C., about 25° C., about 30° C., about 35° C., or any value therebetween. Of course dew points may also be adjusted above or below this range to meet the needs of particular circumstances.

To person having ordinary skill in the art, the driving forces of the present invention that achieve product gases with sub-zero dew points and isothermal dehumidification would be superior and unexpected results. A person having ordinary skill in the art of membranes, looking at the similar results for existing high pressure gas drying units, would also find it to be superior and unexpected that embodiments of the membrane system work with low atmospheric pressure feeds, compared to the 100 psig or greater feeds required for known high pressure gas units.

By using certain membranes, embodiments of the present invention dehumidify gases by creating a vapor pressure difference across such membranes. This removes water vapor from gas without changing the temperature of the gas. Thus, some embodiments of the present invention dehumidify gases isothermally. This one step process is less energy intensive and more controllable than certain previously known methods. The driving force, measured as the effective dew point temperatures of the "sweep gas," can be below the freezing point of water.

Also, because some embodiments of the present invention are able to dehumidify gases that are at ambient pressure, the pressure difference across the membrane is at most about 1 atm, corresponding to the difference between the near vacuum on the permeate side of the system and the atmospheric pressure present on the retentate side Membrane-based gas dehumidification can have technical, energy, and economical advantages over other dehumidification technologies, such as absorption, adsorption, and refrigeration depending on the application. Adsorption (desiccants) and absorption (aqueous salts) exploit a phase change from vapor to a solid or liquid matrix. In contrast to phase change, other properties such as membrane permeability or molecular size can be exploited in the embodiments of the membrane-based separation system of the present invention. The ideal energy cost of separation by phase change (condensation, adsorption, or absorption) is approximately the water's heat-of-vaporization or the latent heat, while the energy cost of a membrane-based separation is only the cost of maintaining a partial pressure difference across the membrane.

The US Department of Energy has previously recognized the low energy cost of membrane separations by including them in road maps for separation research. The advantages of simple installation, ease of operation, and low process cost have allowed successful applications to dehumidify high pressure compressed air (4). Table 1 contains polymers typically used for gas dehumidification along with some other novel membranes. The following table also contains the permeability or permeance along with selectivities. Permeability and permeance are measurements of the partial pressure normalized rate of water vapor transport through the membrane. Selectivity is the normalized rate of water transport divided by the gas transport through the same membrane, and is a measure of humidity separation using the referenced membrane.

Polymers for high pressure gas dehumidification. Permeability given as Permeability Coefficient (1 barrer = 3.348 × 10$^{-16}$ mol/[m Pa s]) or as Permeance (2.988 GPU = 1 × 10$^{-9}$ mol/[m$^2$ Pa s]).

| Material/Membrane | Water Permeability (Barrer) or Permeance (GPU) | Selectivity vs. N$_2$ (air) |
| --- | --- | --- |
| Polymer Materials | | |
| Polydimethylsiloxane (PDMS) | 40 000 barrer | 140 |
| Cellulose acetate (CA) | 60 000 barrer | 24 000 |
| Sulfonated polyethersulfone (SPES) | 15 000 barrer | 210 000 |
| Polyethylene oxide (PEO-PBT) | 100 000 barrer | 52 000 |
| Sulfonated poly(ether ether ketone) (SPEEK) | 30 000 barrer | 300 000 |
| Poly(vinylalcohol)-EDTMPA | 1500 GPU 997.7 GPU | |

However, the term "membrane", as used herein, refers to any membrane that is selective for a substance that is desired to be removed from a feed gas. Thus, the term membrane is not limited to the membranes in the above table. However, membranes can include, but are not limited to polymer membranes, water permeable membranes, and semi-permeable membranes. Furthermore, the membrane can be, but is not limited to, a flat membrane (plate and frame), a spiral wound membrane, a tubular membrane, a hollow fiber membrane, a capillary membrane, or combinations thereof. Each of these geometries has advantages. A geometry with a low pressure drop from the feed to the retentate may be advantageous in certain embodiments of the present invention.

Notably, the rate of transport through a membrane, including those listed above, is generically defined by the equation:

$$Q/A = j = (K/\delta)\Delta F = L_i \Delta F \quad (1)$$

where: j=Q/A is the flux of the transport species (Q=quantity transported, A=surface area of the membrane, K is the permeability coefficient of the membrane material, δ is the membrane thickness, $L_i$=K/δ is the membrane permeance or the inverse of the resistance to flux and ΔF is the driving force or the difference in the transporting species' chemical potential across the membrane. There are many ways of reporting this chemical potential difference; however, the most practical means for water vapor transport is partial pressure. Those of skill in the art may utilize equation 1 to achieve desired mass transfer in an embodiment of the present invention.

Examples of membranes of the present invention include membranes with water selectivity greater than about 200 and water permeances greater than 200 GPUs.

Figure 2:
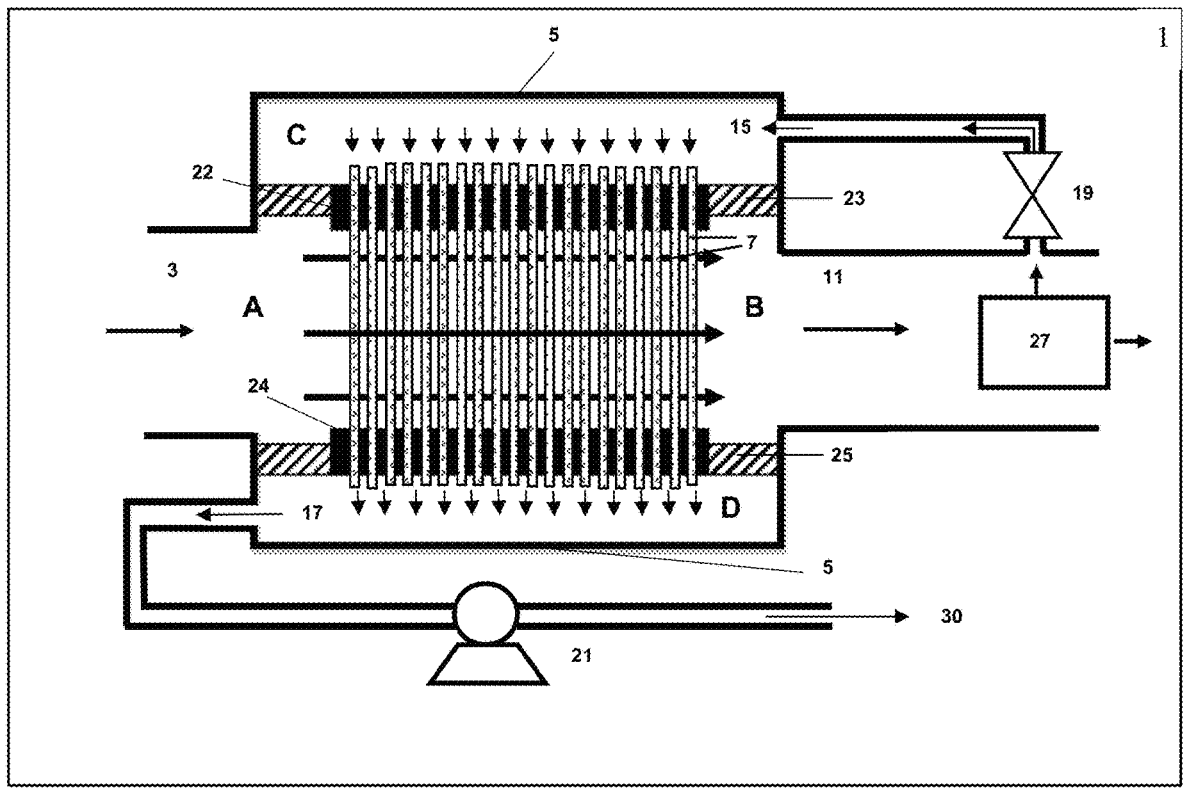
FIG. 2 shows a vacuum sweep dehumidification device of the present invention.

An embodiment of the present invention is shown in FIG. 2.

FIG. 2 shows an apparatus 1 for removing water vapor from gases at ambient pressures without requiring cooling to a target dew point that comprises a membrane housing 5. The membrane housing 5 (e.g., membrane module) comprises a water permeable membrane 7 with water selectivity verses the bulk gas (e.g., feed gas). The membrane joins a sweep in manifold 23 and a sweep out manifold 25. The sweep in manifold defines a sweep gas in pressure zone C and the feed gas pressure zone A. The sweep out manifold 25 defines the feed gas pressure zone A and the sweep gas out pressure zone D. The hollow fiber membrane 7 divides the feed gas pressure zone A into a feed gas "in" side and a feed gas "exit" side B. Also, the membrane attaches to the manifolds to join the sweep gas in and out pressure zones C and D. Gas is supplied as a feed gas to the feed gas pressure zone A of the membrane housing 5 via a feed gas inlet 3. Upon passing over the membrane 7, the feed gas exits the feed gas out pressure zone B via a feed gas outlet 11.

In some embodiments, the feed gas exiting via the feed gas outlet 11 is a product gas, or, more specifically, is a dehumidified gas that can be used for a variety of applications. Sweep gas enters the sweep gas in pressure zone C via a sweep gas inlet 15 and exits via the hollow fiber membrane 7. The sweep gas flows through the hollow membrane's inner flow channel into the sweep gas out pressure zone D and exits the sweep gas out pressure zone via the sweep gas outlet. In defining the zones, the manifolds can include seals, 22, 24.

The permeate that has passed through the hollow membrane 7 wall (e.g., water) into the sweep gas out pressure zone D of the membrane housing 5 also exits the membrane housing 5 via the sweep gas outlet 17.

The term "feed gas", "bulk gas", and the like, as used herein, refer to any gas mixture from which a substance can be removed by the membrane. In certain embodiments the substance to be removed is water, and more specifically, water vapor. In one embodiment, the apparatus is optimized to remove water from air at atmospheric pressure and temperature. Feed gases in other embodiments also include, but are not be limited to, methane, biomethane, ethane, ethylene, ethanol, butane, butane, butanol, and combinations thereof.

FIG. 2 also shows how the feed gas enters the housing via the feed gas inlet 3, contacts the membrane 7, and enters the retentate side/feed gas outlet side of the membrane 7, and then exits as the retentate/dehumidified gas via the feed gas outlet 11 as the retentate. The feed gas exiting the feed gas outlet 11 (e.g., retentate) then passes through an optional flow splitter 19. The flow splitter 19 directs a re-directed portion of the feed gas exiting the housing to the permeate side as the sweep gas.

To aid mass transfer, a vacuum pump 21 may lower the pressure of the sweep gas out pressure zone D below the pressure in feed gas pressure zone A of the membrane housing 5. The feed gas exiting the feed gas outlet 11 may have a lower specific humidity compared to the feed gas that enters the housing via the feed gas inlet 3.

The terms "pump", "vacuum pump", and the like, as used herein, generally refer to any device that modulates gas pressure. In some embodiments the pump imparts low pressure or a vacuum in a structure. Those of skill in the art will be able to determine the appropriate pump to achieve desired pressures in specific embodiments, and will appreciate that pumps are not to be limited in structure, design, and the like, but instead merely need to displace a fluid by any means to modulate pressure. The pumps may be selected from any known pump that may achieve the results desired in terms of efficiency, water removal, capacity, and the like. Examples of pumps include, but are not limited to, reciprocating pumps, rotary pumps, screw pumps, peristaltic pumps, compressors, and centrifugal pumps. Pumps can function to, among other things, keep the permeate side at a lower pressure relative to the retentate side, which drives mass transfer across the membrane, and aids the sweep gas in sweeping the membrane.

The term "flow splitter", as used herein, generally refers to any device or object that can split the flow of a fluid into two or more streams. In some embodiments the flow splitter is a T-junction that splits an incoming stream into two outgoing streams. Furthermore, the "re-directed portion of the feed gas exiting the first pressure side" can be any amount of the feed gas that exits the first pressure side. For instance, the re-directed portion can comprise anywhere from 0.1% to 99.9% of the feed gas exiting the first pressure side.

In some embodiments the re-directed portion of the feed gas exiting the first pressure side comprises about 0.1%, about 2.5%, about 5.0%, about 7.5%, about 10.0%, about 12.5%, about 15.0%, about 17.5%, about 20.0%, about 25%, about 30%, about 35%, about 40%, about 50%, about 60%, about 70%, about 80%, about 90%, about 99.9%, or any value therebetween of the feed gas exiting the first pressure side.

As discussed above, the sweep gas out pressure zone D can operate at a vacuum pressure. As used herein, the terms "lower pressure", "vacuum pressure", "vacuum", and the like generally refer to a pressure that is lower than a pressure in a first pressure side (e.g., retentate side) of a membrane housing. In some embodiments the vacuum pressure is any pressure below ambient pressure. In some embodiments vacuum pressure is less than about 50 mmHg-absolute, 100 mmHg-absolute, or 200 mmHg-absolute.

In some embodiments, a vacuum pressure is about 50 mmHg-absolute, about 100 mmHg-absolute, about 150 mmHg-absolute, about 200 mmHg-absolute, about 250 mmHg-absolute, about 300 mmHg-absolute, about 350 mmHg-absolute, about 400 mmHg-absolute, about 450 mmHg-absolute, about 500 mmHg-absolute, about 550 mmHg-absolute, about 600 mmHg-absolute, about 650 mmHg-absolute, about 700 mmHg-absolute, about 750 mmHg-absolute, about 800 mmHg-absolute, about 850 mmHg-absolute, about 900 mmHg-absolute, about 950 mmHg-absolute, about 1000 mmHg-absolute, or any value there between.

The term "ambient pressure", as used herein, generally refers to a pressure that is equal to about the pressure in the atmosphere in which an apparatus 1 is located and is defined as about −0.2 bars to about +0.2 bars. Accordingly, in some applications the ambient pressure will be approximately 1 atm. However, ambient pressure may deviate due to atmospheric conditions, altitude, and the like. Furthermore, in some embodiments a feed gas is fed to the first pressure side A with a pump, fan, or the like, that can cause the pressure in the first pressure side A to be slightly greater than that in the surrounding atmosphere. Lastly, the ambient pressure in the first pressure side A can deviate in the first pressure side A because of pressure drops caused within the membrane housing 5.

As used herein, the term "sweep gas flow regulator" generally refers to any device that can control the flow of sweep gas into the permeate side and also allows a vacuum pressure to be created in the permeate side. Examples of sweep gas flow regulators include expansion valves, throttling devices, needle valves, other valve designs, capillary tubes, orifices, low selectivity membranes, and the like. The sweep gas flow regulator may be located either inside (not shown), on (not shown), or outside the membrane housing. For instance, the sweep gas flow regulator may be located on a sweep gas flow inlet (FIG. 2), on the wall of the membrane housing, or on the membrane itself. An example of a sweep gas regulator that can be used in connection with the present invention is a standard solenoid or control valve.

A sweep gas flow regulator on the membrane is one example of an internal regulator. In some embodiments the internal sweep gas flow regulator is a leak or orifice on the membrane. For some embodiments comprising an internal sweep gas flow regulator, the sweep gas inlet can also be internal and may or may not be the same element as the sweep gas flow regulator.

Figure 3:
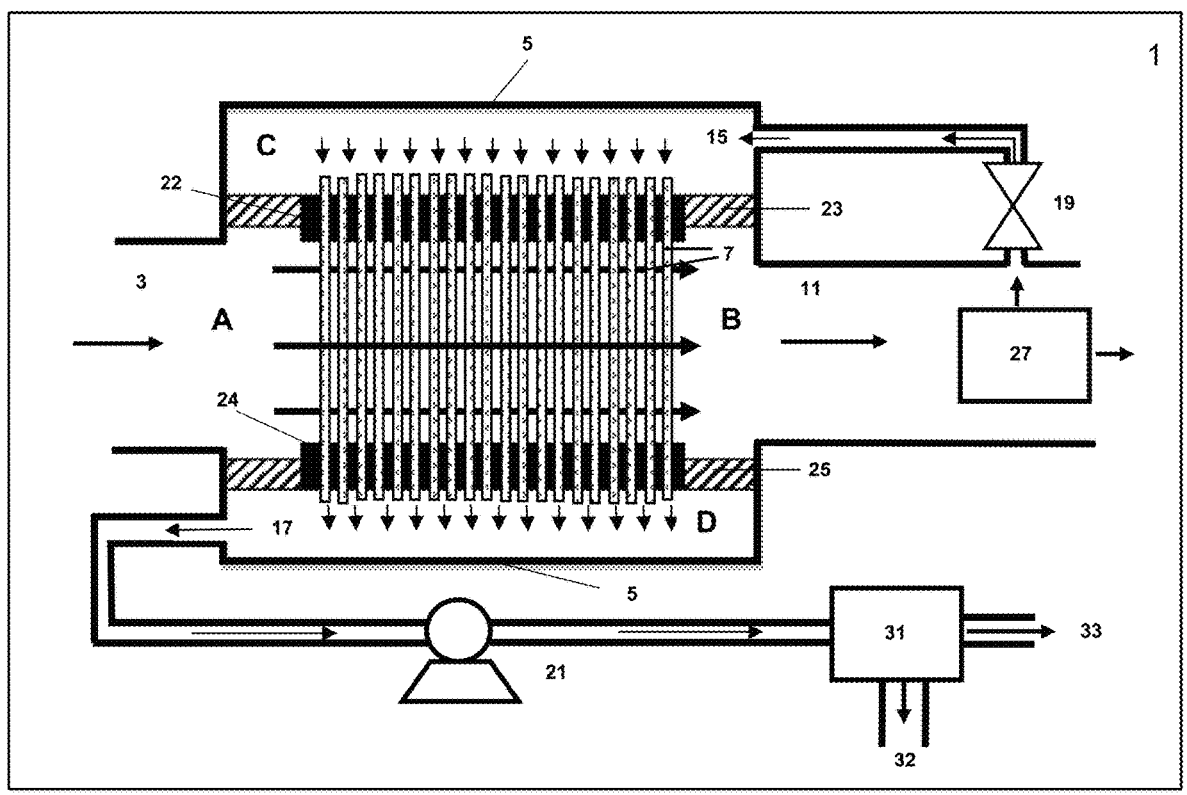
FIG. 3 shows a vacuum sweep dehumidification device of the present invention that further comprises a water collection device.

FIG. 3 shows an embodiment of the present inventions for water recovery. Such embodiments may be desirable for, among other things, the production of water from humid air or dehumidification of gases that should not be vented for economic or safety reasons. For example, in air conditioning systems the desired product is the retentate gas, or less humid gas than the feed gas. However, when the product is water, embodiments can comprise a water collection device 31 (e.g., liquid recovery unit). Because the water collection device 31 removes water from the gas that comes from the sweep gas outlet 17, embodiments can comprise a gas recycle that recycles gas 32 from the water collection device 25 to the feed gas inlet 3. The water collection device may also provide a means for the water to exit the system 33.

The term "water collection device", as used herein, generally refers to any device that can collect water from a fluid that comprises water in gas, liquid, and/or solid form. In some embodiments the water collection device is a known cooling coil system that condenses water that is in the fluid in the sweep gas outlet. The water collection device can also be a device that comprises a membrane to separate water from the fluid in the sweep gas outlet. Any other suitable device may be utilized as a water collection device so long as it separates water from the fluid in the sweep gas outlet and can recover this water as a liquid.

Figure 4:
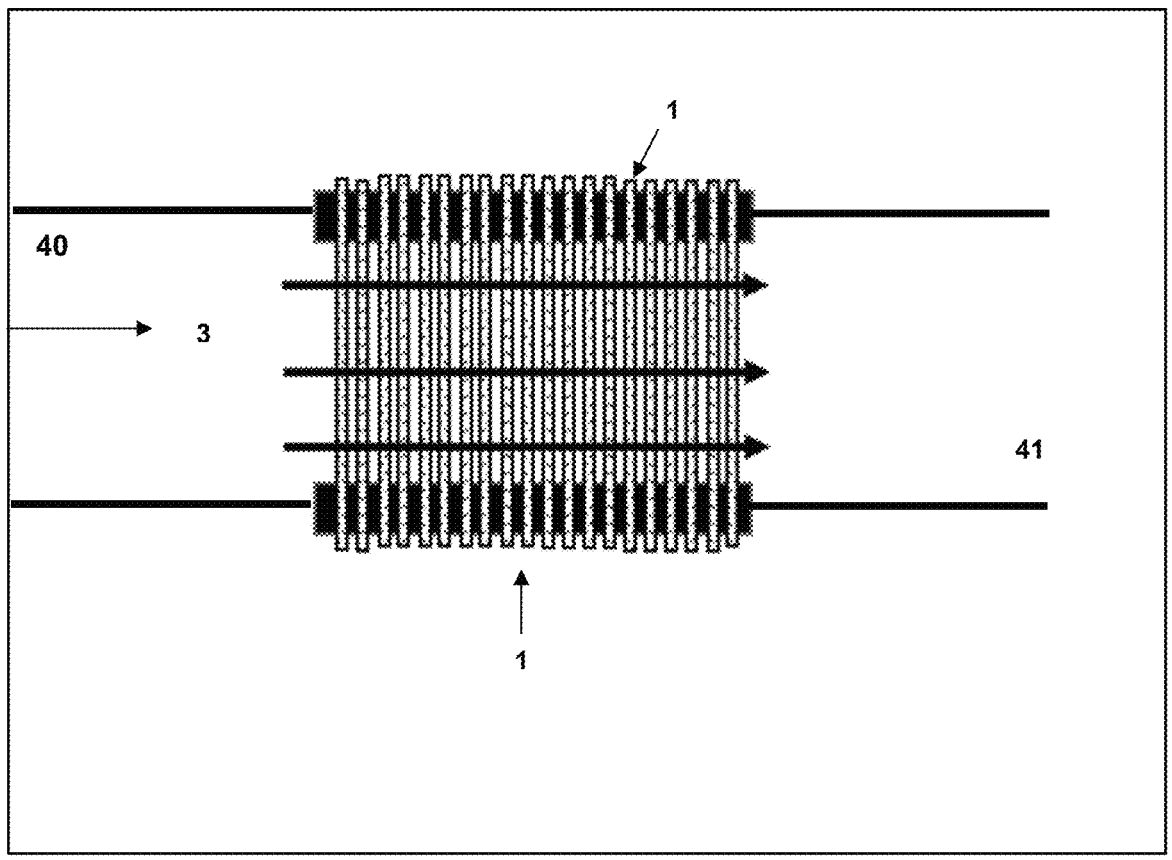
FIG. 4 shows a vacuum sweep dehumidification device of the present invention that is in place in an air duct of an air conditioning system.

FIG. 4 shows an embodiment of the present invention being part of a heating ventilation and air conditioning (HVAC) system. The apparatus 1 is generally the same as that shown in FIG. 2. In this embodiment, the membrane housing is located in the air duct system. Feed gas flows from the upstream portion of the duct 40, through membrane housing, and into the downstream portion of the duct 41. As discussed above, embodiments of the present invention that are part of a HVAC system lower the energy required to both remove water vapor from the feed gas as well as the amount of energy needed to make conditions comfortable within a building, since reducing humidity can reduce the extent to which a building needs to be cooled to feel comfortable.

Figure 5:
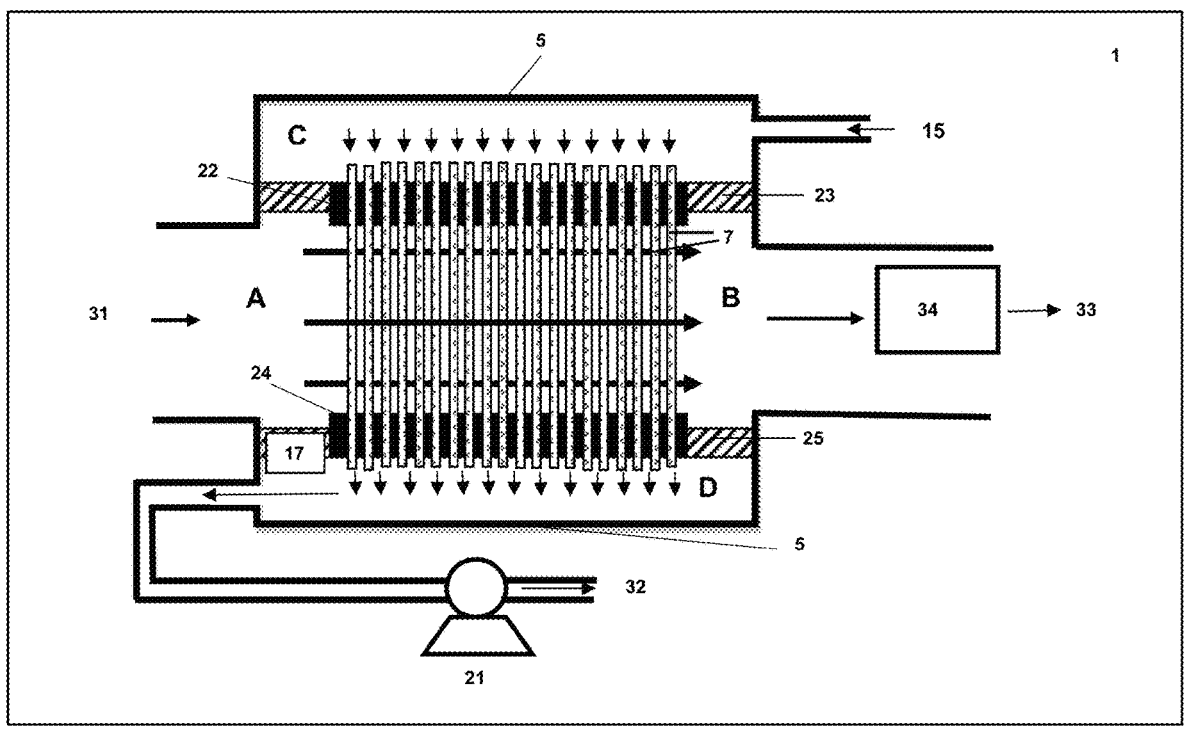
FIG. 5 shows a vacuum sweep dehumidification device of the present invention that is in place as part of a drying system that optionally contains a heater and a drying drum.
Figure 6:
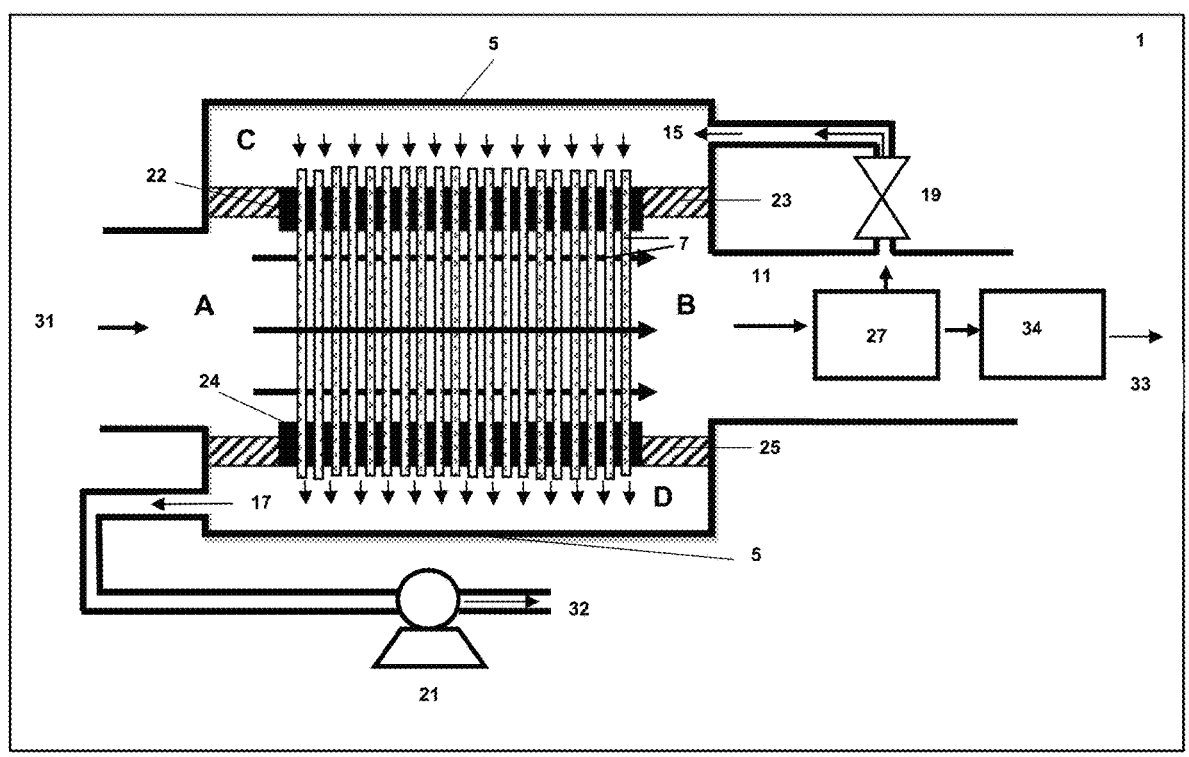
FIG. 6 shows a dehumidification device of the present invention that is in place as part of a drying system that optionally contains a heater and a drying drum. In this embodiment, at least one air stream is recycled.

FIGS. 5 and 6 show an embodiment of the present invention being part of a drying system that comprises a heater 34 and a dryer drum (not shown). As in FIG. 4, the apparatus 1 is generally the same as that shown in FIG. 2. After passing the heater 34, the dehumidified hot air 33 enters the dryer drum to dry a substrate, such as clothes, pharmaceuticals, and the like. In the dryer drum the gas will increase in water content as the substrate releases water vapor. This relatively warm and humid air is then may be recycled through a gas recycle back to the feed gas inlet 31. In doing so, the embodiment minimizes energy loss that would otherwise occur by releasing the relatively warm air from the dryer drum into the atmosphere. Thus, water vapor is removed from the feed gas without significantly cooling the retentate so that the retentate may be returned to the dryer for increased drying efficiency. Of course, the gas recycle (e.g., recycle loop) between the feed gas outlet 11 and the feed gas inlet 3 can pass the gas passes through any chosen device including, but not limited to, dryers, chemical plants, and the like.

The embodiment may also comprise a water recovery unit 31 that is located downstream from the pump 21 as well as a gas recycle that recycles gas from the water collection device 32 back to the feed gas inlet 3, which also minimizes energy losses that would be caused by releasing heated gases. Accordingly, the depicted embodiment removes some or all the water from the substrate in the dryer drum as liquid water in the water collection device 31, and the gases that are heated by the heater are not released, which minimizes energy losses.

Further embodiments of the present invention comprise methods of utilizing the above described embodiments as well as variations thereof for removing vapor water from a gas. Some embodied methods comprise providing an apparatus for removing water vapor from gas, delivering a feed gas to the feed gas inlet of the apparatus, vacuuming a second pressure side of the apparatus with a pump to provide the sweep gas to the second pressure side and dryer water vapor through a membrane of the apparatus, and collecting a product.

Figures 7A, 7B:
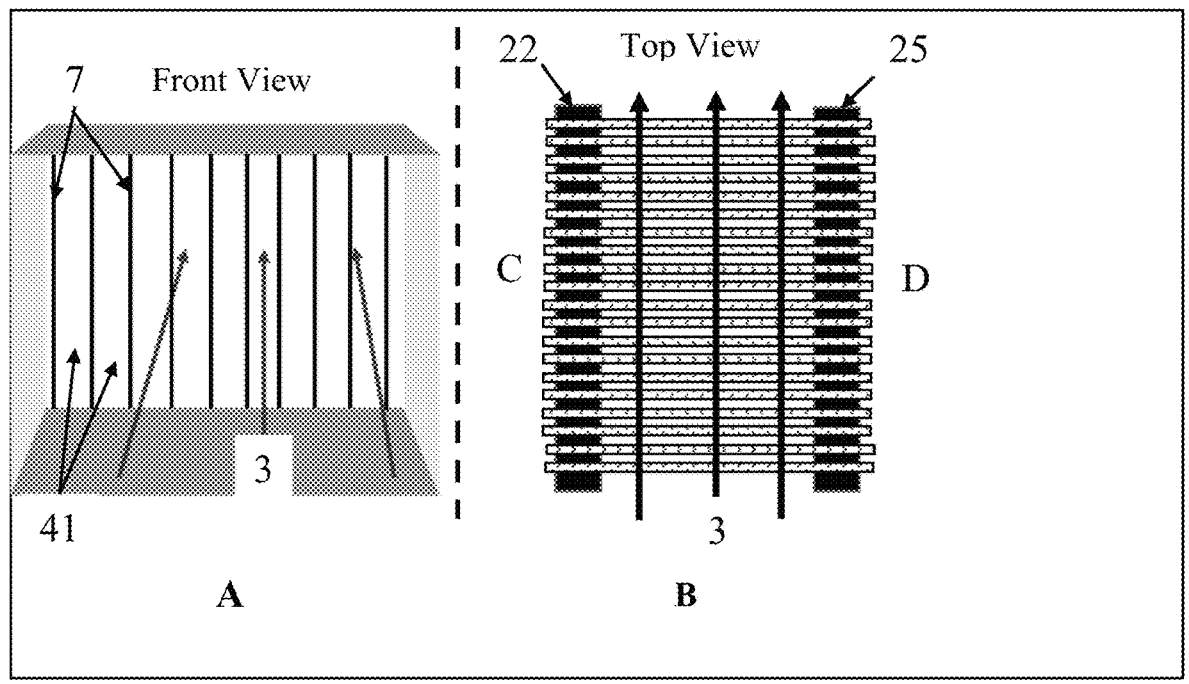
FIGS. 7A and 7B show examples of membrane arrangements of the present invention.

FIGS. 7A and 7B show examples of membrane arrangements of the present invention. FIG. 7A shows layers comprising the hollow-fiber membrane/tubesheet 7 of the present invention and cross current feed gas 3 flow across the membrane. The inter-membrane spacing is also depicted 41. The top view, FIG. 7B shows the stacking of membrane layers to form a multiple layer membrane bed with about 0.13 cm between the layers. The sweep gas flow from the sweep gas in pressure zone C to the sweep gas out pressure zone D is cross-current to the feed gas 3.

As used herein, the term "providing" generally refers to, but is not limited to, making, using, lending, offering, selling, licensing, or leasing an embodied apparatus. Accordingly, the entity providing the apparatus may or may not actively participate in the removal of water vapor from a gas. Furthermore, as used herein, the term "delivering" generally refers to placing a gas in such a position that it enters the feed gas inlet of an apparatus. For example, delivering may be an active process where the feed gas inlet has a negative pressure and therefore draws the gas into the feed gas inlet. In other embodiments feed gas is delivered by a fan, pump, compressor, or the like to the feed gas inlet. "Vacuuming", as used herein, is used to refer to the activation of a pump of an apparatus, which in turn imparts a low or vacuum pressure in the second pressure side of an apparatus and thereby moves a sweep gas through the second pressure side and/or drives mass transfer across the membrane of an apparatus.

Lastly, the term "collecting", as used herein, refers to the physical collection, use, manufacture, or the like of a "product". For example, collecting a product can comprise venting feed gas from a feed gas outlet into a building or structure so that the air within the structure is less humid that it would otherwise be. Collecting a product can also comprise collecting condensed water vapor from a water collection device and using it for drinking or non-drinking purposes. Collecting a product can also comprise using the feed gas from a feed gas outlet for various processes, such as drying clothes with a dryer, pharmaceutical process, defrosting windows, and so forth. Accordingly, those of skill in the art will appreciate that one or more different products may be collected from embodiments of the present invention for various different purposes.

Another embodiment of the present invention is a membrane module that may be constructed unlike membrane modules currently in general use. Hollow fiber modules with the feed gas passing through the interior of the hollow fiber may have too high of a pressure drop. Fortunately, significant progress has been made in designing membrane modules with minimum feed gas pressure drop. Newbold et al., "Hollow fiber air drying," J. Membrane Sci., vol. 72, pp. 231-244, 1992; and Kneifel et al., "Hollow fiber membranes contractor for air humidity control: Modules and membranes," J. Membrane Sci., vol. 276, pp. 241-251, 2006, (both of which are incorporated herein by reference), describe designs of membrane modules that can be used in connection with the present invention. In the case of the Kneifel et al., designed air flow velocities of 4 meters/sec produced back pressures of less than 0.001 bars. This result is still useable for the present invention's purposes even though the membrane module used aqueous salts as an absorption-based dehumidification working fluid on the permeate side of the membrane.

In other embodiments, sweep flow rate and permeate pressure may not be totally independent of each other, and may work together to establish the necessary driving force to remove the desired level of humidity from the feed. The energy cost of this system may be dependent on sweep flow rate and/or permeate pressure. Decreasing the permeate pressure or increasing the sweep rate both may lead to larger vacuum pump energy demands via the following isothermal relationship:

$$\text{Work}=NRT*\ln(760/P_P)/\text{efficiency} \quad (2)$$

where N=number of moles pumped by the vacuum pump, which is the sum of the fraction of feed recycled as the permeate sweep plus the moles of water fluxed through the membrane, R=ideal gas constant, T=absolute temperature of the process. $P_P$=permeate absolute pressure in mmHg, and efficiency=vacuum pump isothermal efficiency. Note that in the energy relationship formula, the total moles in the sweep, N, has a direct relationship, while the permeate pressure, $P_P$, has a logarithmic relationship. Therefore, the sweep rate may be the more sensitive factor in reducing the energy cost.

As discussed herein, embodiments of the present invention remove water vapor from gases using a water selective membrane. The driving force for water flux through the membranes can come from expanding a small portion of the retentate gas into the permeate space of the membrane module that is maintained at a lower absolute pressure than the feed/retentate side pressure. The combination of gas expansion and low absolute pressure sweep gas may establish a driving force strong enough to achieve dehumidification efficiencies >200%. In some embodiments dehumidification efficiency is about 200% to about 600% or even greater. Of course, dehumidification efficiencies of less than 100% are competitive with current technologies and may be desired in certain embodiments. In some embodiments the efficiency is 50%-100%. Dehumidification efficiency may also be adjusted to be about 1% to about 50%. Thus, the retentate gas humidity may be significantly reduced compared to the feed gas.

Some embodiments of the present invention can remove humidity with a small sweep rate and obtainable permeate pressures. Combining the removal of humidity with the dehumidification efficiency, some embodiments achieve optimal performance at a permeate pressure near 50 mmHg, which is reachable using single stage reciprocating vacuum pumps. Good performance may also occur for some embodiments using higher permeate pressures such as 100 mmHg, which are within the reach of rotary water-sealed pumps.

Some embodiments of the invention are low energy systems for direct humidity control air conditioning. Therefore, embodiments of the present invention directly meet needs previously defined in the literature and engineering guidelines that are not met with current commercially available technologies. Embodiments of the present invention remove humidity from gases in ways that cannot be achieved with certain conventional cooling coil dehumidification; namely, isothermal dehumidification and the production of gases with dew points <0° C. Both of these results may be superior and unexpected to those routinely engaged in air conditioning engineering.

Other non-limiting examples of applications for low energy dehumidification could also include defrosting car windows without the need to run the air conditioner, thus saving gas. Also, considering the permeate as the product, this invention may produce drinking water in remote locations, and may therefore be proper for humanitarian or military applications.

In aspects of the present invention, the feed to retentate operational pressure may be in the range of about −0.2 to 0.2 bar gauge pressure (−3 psig to +3 psig). The pressure lost (in feed to retentate) is preferably less than 0.2 bars (3 psig) with a preference value less than about 0.002 bars (0.2 kPa or 0.03 psid).

With respect to sweep to permeate, the permeate exit pressure is preferably less than about 30% of the feed pressure, preferably less than about 13 kPa-abs (100 mmHg-abs). The pressure lost (sweep to permeate) is generally in the range of about 3 to 17 kPa, preferably less than about 17 kPa (130 mmHg).

EXAMPLES

The disclosed embodiments of the present invention are further illustrated by the following non-limiting examples.

Example 1

This example further describes membranes that can be used in the apparatus of the present invention.

The membrane geometry with the highest mass transfer, and a preferred embodiment of the present invention is a hollow fiber because of their large surface area to volume ratios. Furthermore, Kneifel et al. concluded that for absorption dehumidification membrane processes hollow fibers are the best. Of the different hollow fiber flow possibilities; specifically, flows inside tubes vs. flows outside of tubes; the faster mass transfer coefficients are for flows outside of the hollow fibers. Since the design specification calls for maximizing the mass transfer of the feed/retentate boundary layer, the tested prototypes in the manuscript all have the feed flowing outside of the hollow fibers. This arrangement also helps with the fluid pressure losses since the specified feed/retentate pressure loss (0.06 kPa) is 0.4% of the sweep/permeate pressure lost specification (17 kPa). The prototypes used hollow fiber dehumidification membranes with outer diameters (OD) of 650 microns and inner diameters (ID) of 340 microns.

Example 2

This example demonstrates embodiments of membrane geometry for embodiments of the present invention. Examples of membrane geometry are shown in FIG. 6. Specifically, the membrane module geometry of Embodiments IIIb and IVb targets improving the feed/retentate boundary layer mass transfer coefficient without factoring in how the geometry might negatively impact the sweep/permeate contribution to mass transfer. While this approach results in the use of the less efficient cross-current flow it does take advantage of the surprising finding that mass transfer for flows outside and across (i.e. generally perpendicular to) the fibers is greater than 10 times more effective than flows outside and parallel to the hollow fibers.

FIGS. 6 and 7 shows an embodiment of the present invention, IIIb. In this embodiment, J-B Weld Industro Cold Weld® epoxy was used for potting. Each layer in this embodiment contains 30 hollow-fibers held in place and apart from adjacent layers with 0.127 cm (0.05 in) thick plastic spacers epoxied in place. Based in part on the work of Kneifel et al., the hollow-fiber spacing was ≈4 fibers per cm for a cross-sectional void space of 74%. After the epoxy cured, a wood chisel removed the excess epoxy leaving the finished manifold ends (FIG. 7). Embodiment IIIb (FIG. 7) contains 34-layers of 15.24 cm (6 inches) long fibers, 30 fibers per layer, giving a total membrane transport area of 0.2 $m^2$ with a packing density of 227 $m^2/m^3$. Embodiment IVb follows a similar construction pattern but on a larger scale.

When designing embodiments of the present invention, avoiding choke flow conditions is, of course, preferred because of the low to medium vacuum conditions of the sweep/permeate flow. Embodiments have sweep/permeate flowing through hollow fibers with small inner diameters (ID=0.34 mm, for example). These small ID's and vacuum conditions limit the hollow fiber length and introduces an inefficiency of large pressure losses in the sweep gas through both reduction in the partial pressure driving forces and additional vacuum pump work. For a given sweep rate the partial pressure driving force, in addition to the water flux, is a function the sweep pressure in, $P_{sweep}^{in}$, and out, $P_{sweep}^{out}$, of the membrane module. The vacuum pump work is a function of $P_{sweep}^{out}$. Since $P_{sweep}^{out}$ is $P_{sweep}^{in}$ minus the pressure loss of the sweep gas, $\Delta P$, a large $\Delta P$ will decrease the driving force while increasing the vacuum pump work. Imposing a working pressure of 50 to 100 mmHg-abs on the vacuum pump and a need to avoid the maximum energy peak at sweep pressures of 225 mmHg, then the $\Delta P$ is limited to about 125 to 175 mmHg.

Example 3

This example compares membrane arrangements.

This comparison uses the absolute humidity of the American Refrigeration Institute's ARI-80/67 standard. The standard is one possible combination of outside make-up air and building air retuned as feed to an air conditioning system. The ARI-80/67 gives a common comparison of VSD-performance vs. other dehumidification technologies in the Heating, Ventilation, and Air Conditioning (HVAC) literature. The ARI-80/67 has an absolute humidity of 0.011 kg-water/kg-DA. Air with this humidity and a temperature of 25° C. would have a relative humidity of 56%.

The testbed, a scaled down air conditioning duct, had a cross sectional area of 7.62 cm×7.62 cm (3"×3") with temperature (National Semiconductor LM34 sensors) and relative humidity sensors (Calibrated Honeywell HIH-4011 Series sensors) upstream and downstream of the membrane module. A wind speed sensor at the testbed's exit measured the volumetric flow rate of the treated air. A vacuum pump pulled the sweep gas from the treated air (retentate) through the following elements: first a rotameter, second a nettle valve to control the sweep rate, third the sweep-in manifold, then down the center of the hollow-fibers, through the sweep-out manifold, and finally a pressure control valve before entering the vacuum pump. In addition to the rotameter, the sweep gas pathway also had pressure gauges (Omega PX139 sensors) for sweep in and sweep out along with a relative humidity sensor for the sweep out stream.

Three feed rates were tested (24, 50, and 100 SLPM) and for each feed rate we tested four to five sweep rates. The reported sweep rates included the air flow through the rotameter, water vapor fluxed through the membranes, and the amount leaked through imperfections in module construction (upstream manifold and membrane potting). We calculated the leak rate by using the measure pressure drop in the sweep gas and a calibrated compressible gas flow formula. An isentropic compressor work equation with an efficiency of 75% calculated the work required to pump the total sweep rate.

The parameters used to evaluate the membrane module design fall into three categories: i.) Physical/Structural, ii.) Fluid Dynamics, and iii.) Performance. Membrane density and void space are the two physical/structural parameters. Membrane density ($m^2/m^3$) is the membrane transport surface area divided by the module volume. Membrane density is a scaling factor for determining the equipment size for a specific membrane module design. Void Space is the fraction of the cross sectional area, normal to the feed air flow, not occupied by membrane material; it impacts the local air velocity over the membrane and the feed to retentate pressure drop. The void space is <500 m^2/m^3.

The fluid dynamic properties are feed velocity, pore velocity, percentage (%) of feed in sweep, and space velocity. The feed velocity (m/s) is the volumetric feed rate divided by the superficial cross-sectional area of the membrane module. The pore velocity is the feed velocity divided by the void space. The pore velocity impacts the mass transfer coefficient and humidity removed. The percentage of the feed in the sweep (%) is the total permeate flow divided by the feed rate and links the permeate flow rate to the feed rate along with giving the product loss. The space velocity ($m^3$ $s/m^2$) is the volumetric feed rate divided by the membrane transport surface area. Space velocity or feed rate per membrane area is a scaled feed rate found in the literature of membrane module design and we include it to facilitate our data comparison with literature.

The performance parameters include Humidity Reduction, Overall Membrane Module Permeance, and Process Efficiency. Humidity reduction is the absolute humidity reduction from Feed to Retentate streams, reported either as g-water/kg-DA or percent reduction. The overall membrane module permeance has the same definition as Eq. (1)'s overall mass transfer coefficient, $K_o$. The units of $K_o$ depend on the units of the overall transfer driving force. If the driving force is in the partial pressure of water vapor, $K_o$ using the industrial conventional unit of GPU or Gas Permeation Unit=$3.347 \times 10^{-10}$ mol/(m² Pa s) is reported. If the driving force is instead given in moles per volume (mol/m³) then $K_o$ will have units of m/s or cm/s. The moles/volume driving force is the standard used in mass transfer correlations.

Coefficient of Performance (COP) is a vapor compression refrigeration cycle (VCC) term defined as $Q_T/W_{net}$ where $Q_T$ is the Latent Heat plus the Sensible Heats. The HVAC industry defines air conditioning energy efficiency using COP. The use of COP has a historical basis in that historically processes used to remove the moisture involved a phase change such as, condensation, absorption, or adsorption. The processes needed to move this enthalpy of phase change in order for dehumidification to be continuous. The lowest energy means of moving this enthalpy is via a refrigeration (or heat pump) cycle. Therefore, history has resulted in thinking of the energy benefit (enthalpy of phase change) divided by energy input (refrigerant compressor).

In order to avoid confusion between the refrigeration cycle's COP (total cooling load divided by compressor work) and the dehumidification COP (latent heat divided by work), the Coefficient of Dehumidification Performance (CDP) is introduced.

$$CDP = \text{Latent Heat}/W_{net} \tag{2}$$

The relationship between CDP and the COP of a VCC system is $$CDP = COP(1-SHR) \tag{3}$$

$$\frac{\Delta G}{RT} = \sum x_i \ln x_i \tag{4}$$

Therefore the ideal work to create a retentate with a water vapor mole fraction of $x_R$ from a feed with a water mole fraction of $x_F$ is:

$$\text{Work}_{Min} = RT\langle x_F \ln x_F + (1-x_F)\ln(1-x_F) - (x_R \ln x_R + (1-x_R)\ln(1-x_R))\rangle \tag{5}$$

$$\text{and } \eta_{sep} = \text{Work}_{Min}/\text{PumpWork} \tag{6}$$

Table 1 contains the physical and fluid dynamic properties of the prototype membrane modules constructed for our study. Comparative example II and embodiment IIIb were used to test the mass transport/performance of alternative module designs. Therefore, II and IIIb have equivalent membrane areas and feed/retentate pore velocities. Embodiment IVb was used to test feed/retentate pressure drops under full scale air conditioning duct conditions.

Comparative example II is a counter-current prototype similar to FIG. 1, where the feed gas runs parallel to the membrane. II consists of six (6) bundles of 40-hollow fiber membranes potted at both ends into copper tubing using J-B Weld Industro Cold Weld® epoxy. Before applying the epoxy, we slid rubber tubing around the edge of the copper tube to protect the exposed membranes. After the epoxy cured for 24 hours, we cut the tubes using a tube cutter, which left the lumen of the membranes unpinched to allow air flow. The sweep in and out manifolds each contained six Swagelok® fittings for sealing the ⅜" copper bundle ends with nylon ferrules to avoid destruction of the epoxy potting. The manifolds allowed easy air flow around and parallel to the Swagelok® fittings attached to the hollow fiber bundles. The hollow fibers in these six bundles then were spread out inside of a 7.62 cm×7.62 cm (3"×3") cross sectional box to create a membrane module with a packing density of 84.4 m²/m³. The fiber lengths of 39.4 cm (15.5 inches) resulted in a total membrane surface area of 0.2 m², using membrane O.D. of 6.5×10⁻⁴ microns.

TABLE 1

Physical and Fluid Dynamic Properties of Tested Prototypes

| Prototype | Membr. Density (m²/m³) | Membr. Area (m²) | Module Volume (m³) | Space Velocities (m³ s/m²) × 100 | Void Space (in flow direction) | Feed Superficial Velocities (m/s) | Pore Velocities (m/s) |
|---|---|---|---|---|---|---|---|
| II | 84.4 | 0.2 | 0.0023 | 0.21-0.86 | 0.986 | 0.07 to 0.29 | 0.07 to 0.29 |
| IIIb | 226.6 | 0.2 | 0.0010 | 0.17-0.70 | 0.74 | 0.05 to 0.20 | 0.07 to 0.28 |
| IVb | 222.4 | 0.9 | 0.0038 | | 0.74 | | |

Where SHR is the feed air's sensible heat ratio. For example, the ARI-80/67 standard has a SHR of 0.7 (70% of the $Q_T$ removed via VCC dehumidification comes from changing the temperature). So a VCC with a COP of 3 will produce a CDP of 0.9, not 3.

While defining CDP respects the HVAC industry convention, a thermodynamic definition for the separation process that is dehumidification could be $\eta_{sep}$=ideal work divided by vacuum pump work. From a separation perspective exploiting phase change is only one of many options and that the ideal separation work is the minimum work to overcome the entropy cost or the negative of the energy of mixing:

The experimental volumetric feeds ranged from 24 to 100 liters per minute producing conduit velocities in the feed air duct of 0.07 to 0.29 m/s. Because of differences in the module feed/retentate chambers, the feed velocities in II ranged from 0.07 to 0.29 m/s while the feed velocities in IIIb ranged from 0.05 to 0.20 m/s. To facilitate mass transport comparisons between the two module designs, the pore velocities inside of II and IIIb had identical ranges (Table 1).

Figure 8:
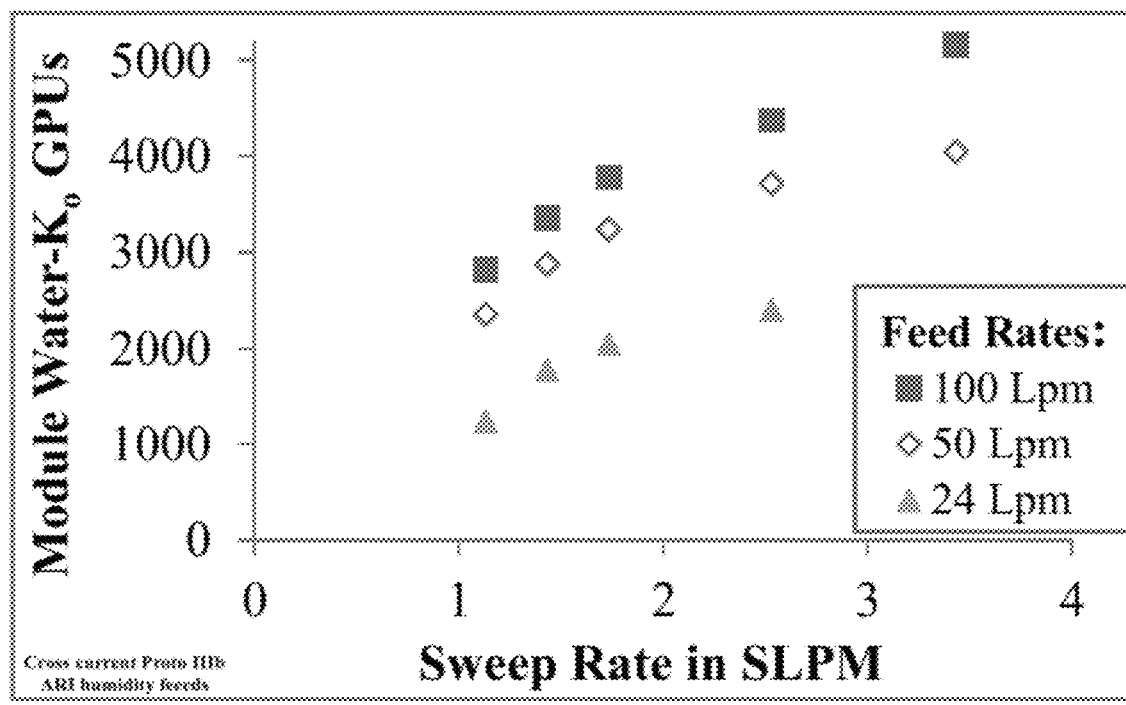
FIG. 8 is a graph that shows overall membrane module water permeance, $K_o$ for an embodiment of the present invention. As shown in the graph, the module permeance increases with both increasing feed and sweep rates.

FIG. 8 shows the relationship between the overall mass transfer for example IIIb vs sweep rate organized by constant volumetric feed rates. FIG. 6 indicates that overall module permeances increases with increasing sweep rates and increasing feed rates.

Figure 9:
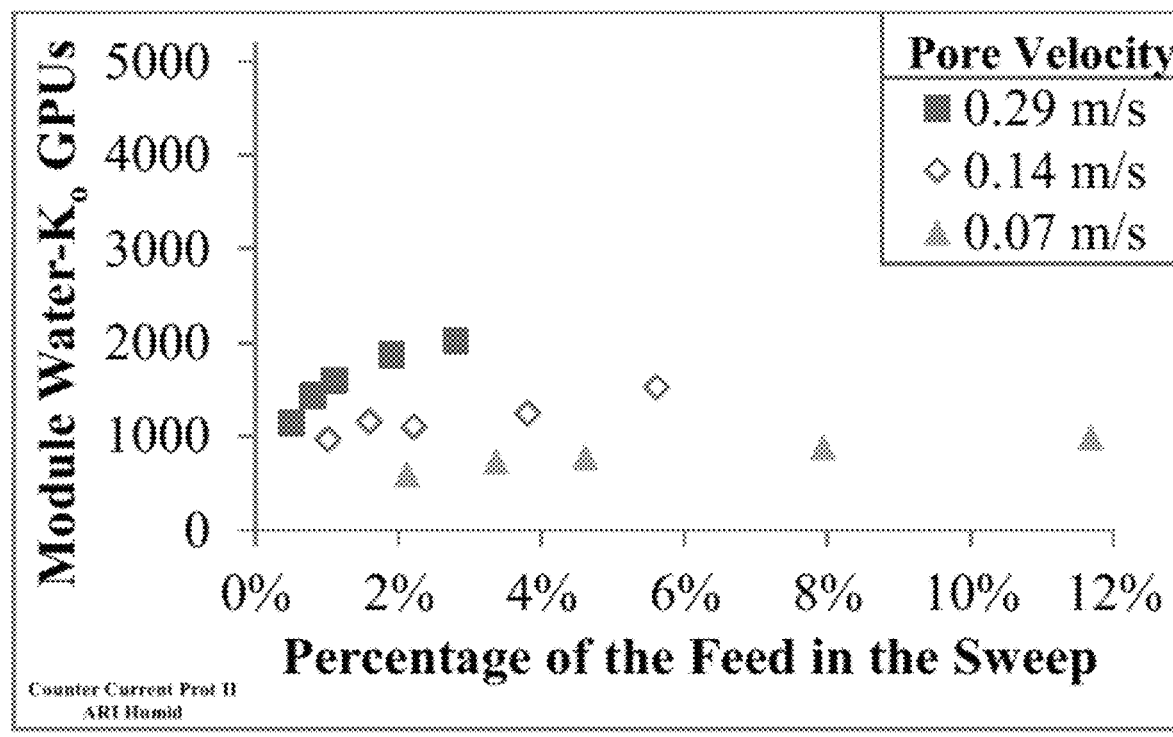
FIG. 9 is a graph that shows overall membrane module water permeance, $K_o$, vs. the sweep/feed ratio for various pore velocities in the feed/permeate stream for comparative example II. As shown in the graph, for a given feed rate there is minimum improvement in water permeances for sweep/feed ratios.
Figure 10:
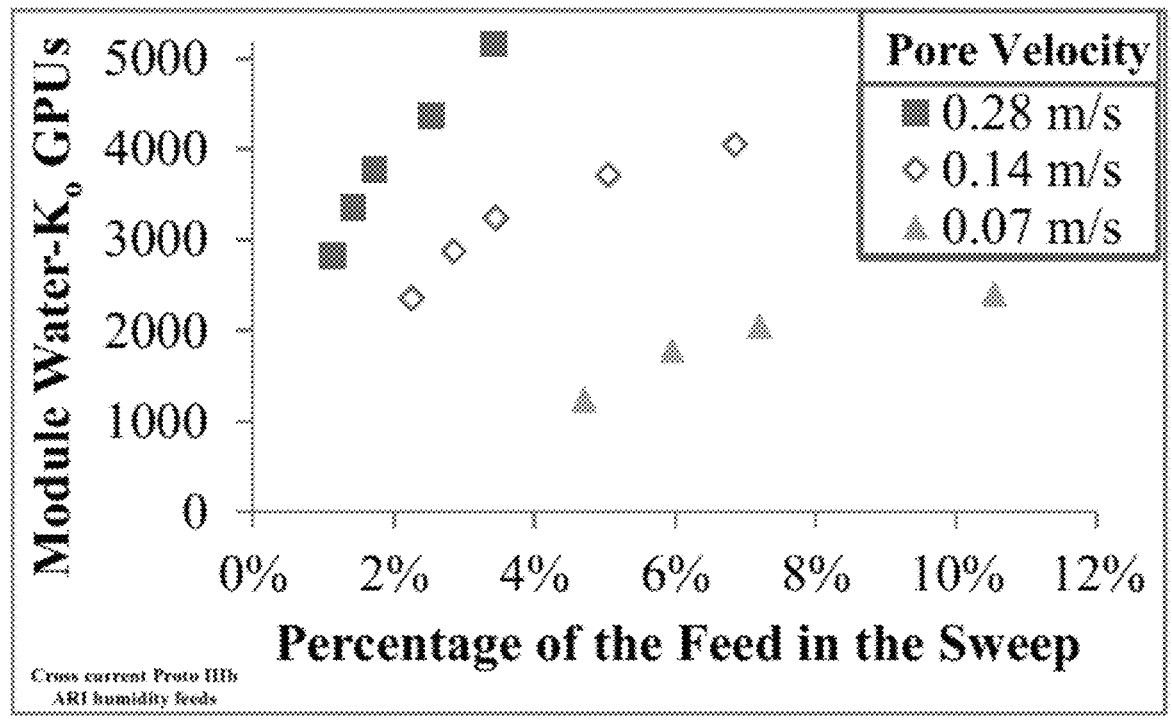
FIG. 10 is a graph that shows overall membrane module water permeance, $K_o$, vs. the sweep/feed ratio for various pore velocities in the feed/permeate stream for Example III. As shown in the graph, a rapid improvement in water permeances for sweep/feed ratios.

FIGS. 9 and 10 show the relationship of the overall module water permeances vs. the percentage of feed in the sweep and the feed to retentate fluid velocities (pore velocities). FIGS. 9 and 10 both show rapid improvement in the water permeances as the sweep/feed ratio increases up to 5%. For embodiment IIIb (FIG. 10), the improvement in water permeances diminishes as the sweep/feed ratio approaches 10%. This superior to comparative example II (FIG. 9) that has minimum improvement in water permeances after sweep/feed ratios of 4%. These results are consistent with modelling and testing of high feed pressure gas drying that recommended sweep/feed ratios less than 10%.

Figure 11:
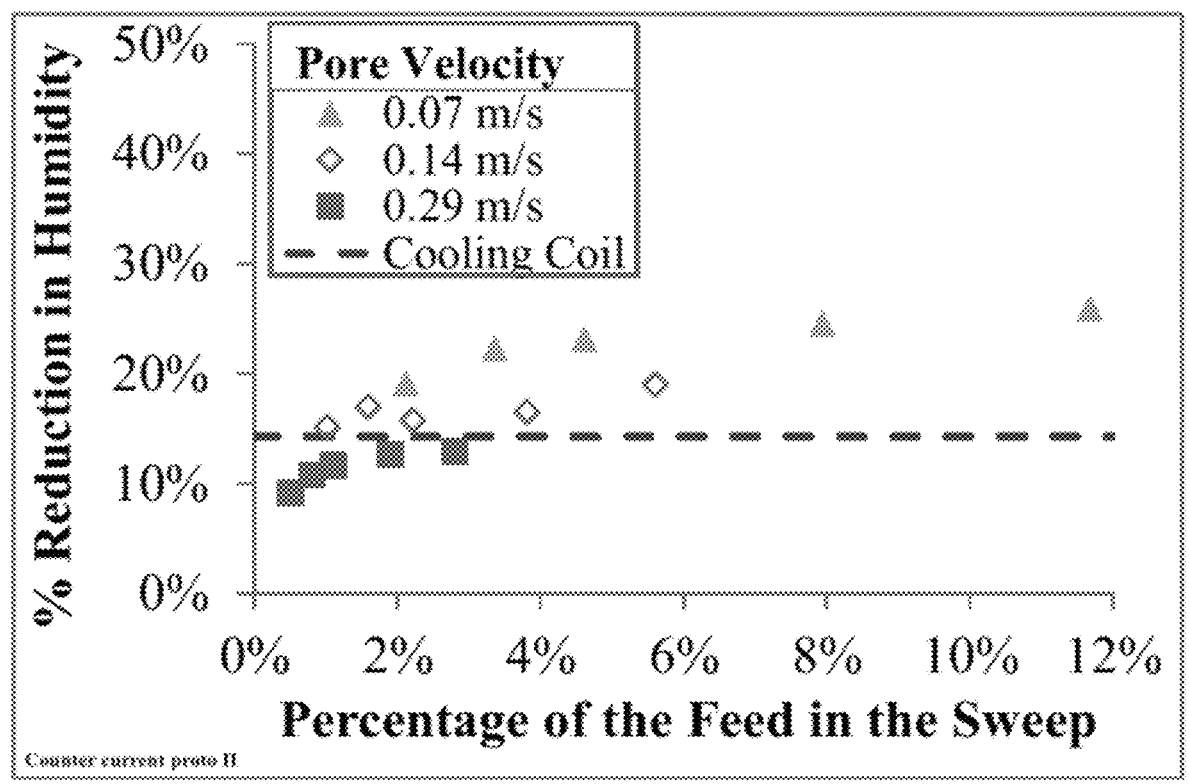
FIG. 11 is a graph that shows comparative example II's reduction in absolute humidity vs. the sweep/feed ratio for various pore velocities in the feed/permeate stream. The data show improvement in humidity reduction for sweep/feed ratios up to about 4%.
Figure 12:
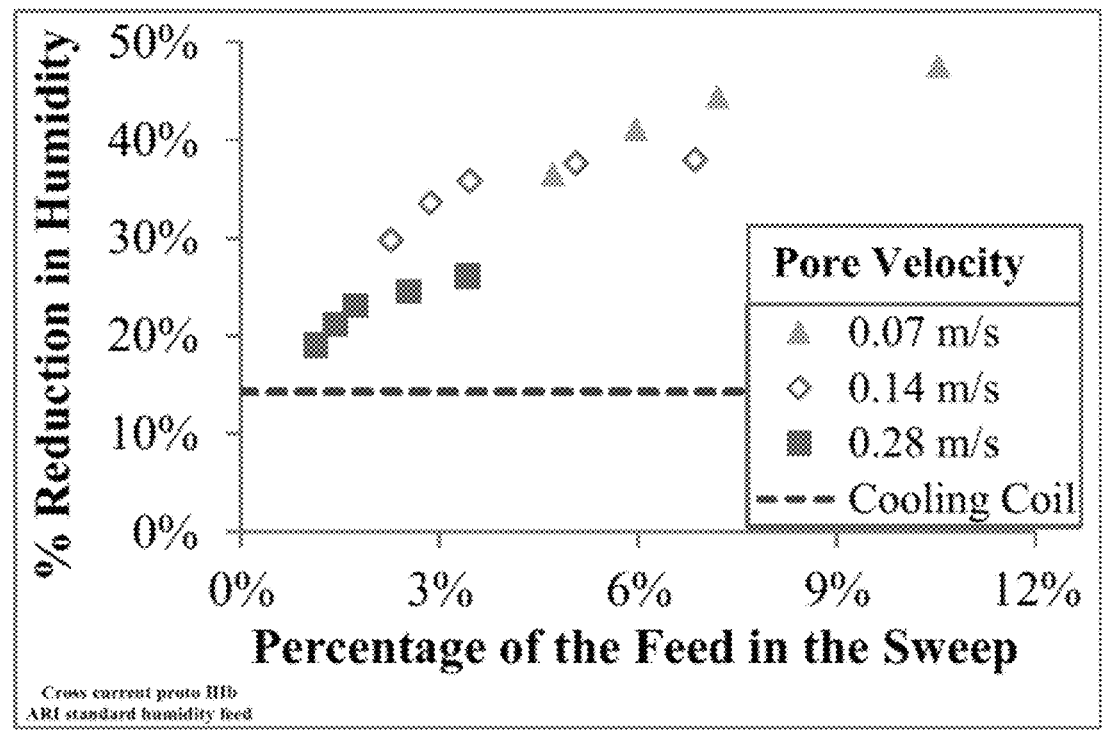
FIG. 12 is a graph that shows comparative example IIIb's reduction in absolute humidity vs. the sweep/feed ratio for various pore velocities in the feed/permeate stream. The data show the reduction in humidity for all tested conditions was greater than a typical cooling coil air conditioning system.

FIGS. 11 and 12 show the relationships between the percentage reduction of absolute humidity vs. the sweep/feed ratio organized by constant pore velocities for comparative example II (FIG. 11) and IIIb (FIG. 12). Similar to water permeance behavior (FIGS. 9 and 10), there is a rapid improvement in humidity reduction as the sweep/feed ratios increase up to 4% for II (FIG. 11) and 7% for IIIb (FIG. 12). While increasing the feed rate (pore velocity) increased the overall module permeance (FIGS. 8-10), it actually results in a decrease in humidity reduction. This is a common trade-off in mass transfer operations. The dashed (----) lines show the typical reduction in humidity from a standard cooling coil attached to a refrigeration cycle. In all of the test conditions, IIIb had a greater reduction in humidity that the industry standard cooling coil.

Figure 13:
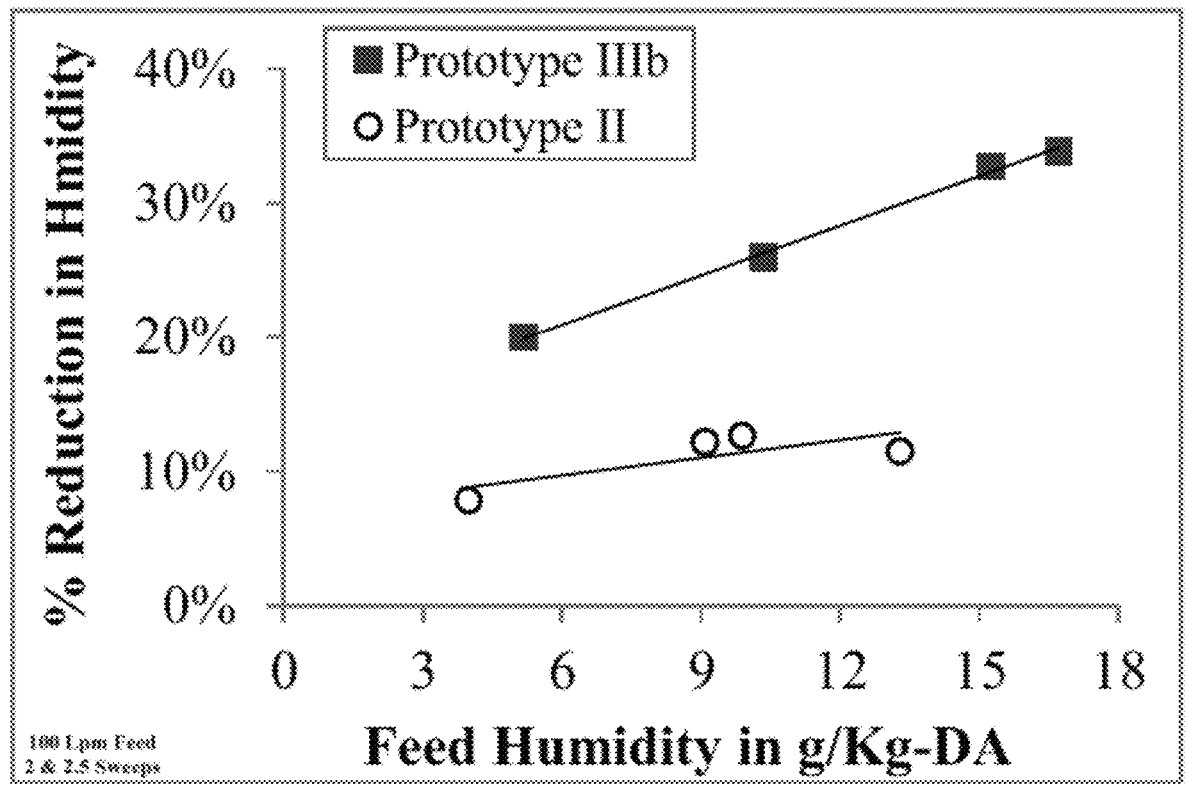
FIG. 13 is a graph that compares II and IIIb in reduction in absolute humidity vs. absolute humidity in the feed. The data show IIIb's increase in humidity removal performance with increasing feed humidity is superior to II's.

FIG. 13 shows the relationship of percentage reduction in humidity vs. the absolute humidity in the feed. The percentage reduction in humidity improves with increasing feed humidity for both prototypes. However, FIG. 13 shows that IIIb's increase in humidity removal performance is superior to comparative example II's.

Figure 14:
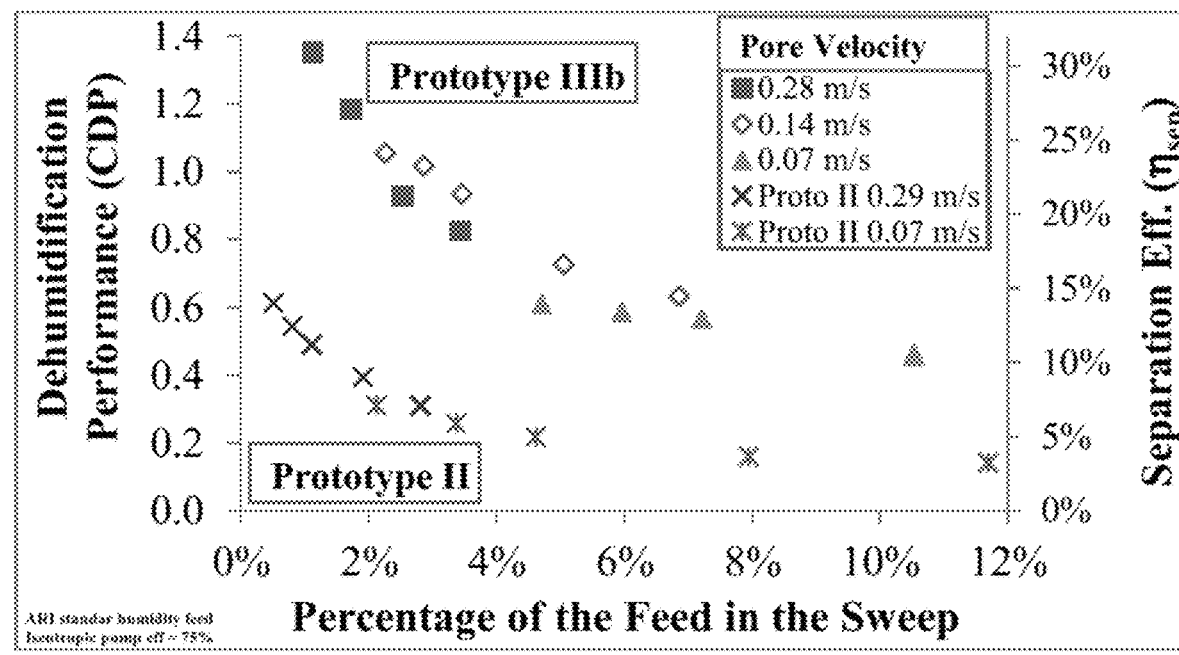
FIG. 14 is a graph that shows dehumidification energy efficiencies reported as Coefficient of Dehumidification Performance (CDP) and Separation Efficiency, $h_{sep}$. The prototype's energy efficiencies are a strong function of the sweep/feed ratio and a negligible function of the feed rate.
Figure 15:
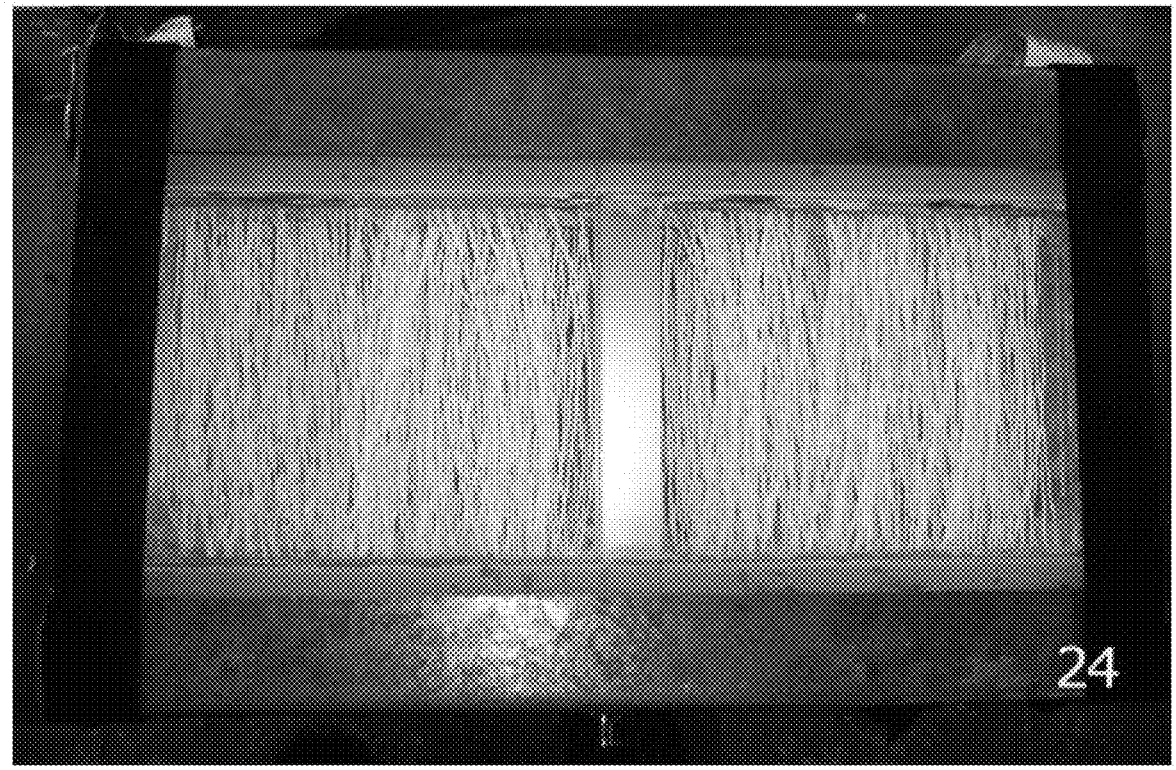
FIG. 15 is a photograph of example IVb. It is a scaled up version of IIIb showing how a rectangular construction reduced the percentage of module perimeter available for race-tracking. Prototype IVb had 24 membrane layers with 108 fibers per layer for a total of 0.8 m².

FIG. 14 shows the process efficiencies (defined in Section 4.3) for Prototypes II and IIIb vs. the sweep/feed ratio. The dehumidification efficiency is a strong function of the sweep/feed ratio and a negligible function of the feed rate (pore velocity). The present inventors have discovered that decreasing the feed rate will increased the humidity reduction at the same process efficiency and sweep/feed ratio. Looking at using a cooling coil to remove humidity from building air then the CDP of the cooling coil would be a function of the sensible heat ratio (SHR) of the feed air. The SHR does not impact the vacuum sweep dehumidification (VSD) CDP's reported in FIG. 12. In order to compare the FIG. 14 data with a standard HVAC cooling coil attached to a refrigeration cycle with a COP equal to 3, the present inventors look to using the SHR for the ARI-80/67 standard (SHR=0.7). The cooling coil, therefore, would have a CDP of 0.9. Example IIIb exceeds this cooling coil CDP for sweep/feed ratios less than 4%; comparative example II's CDP does not.

One non-thermodynamic measure of IIIb's module efficiency is the approach of its cross-current driving force to the counter-current log-mean driving force. Table 2 contains the configuration correction factor to allow the use of counter-current log-mean driving forces for cross-current exchangers with one fluid mixed and one fluid unmixed calculated using the tested Prototype IIIb conditions. The effective Prototype IIIb driving force is within 90% of the counter-current driving force for all the tested conditions.

TABLE 2

Example IIIb Configuration Correction Factor, the approach of the module's cross-current driving forces to a counter-current log-mean driving force.

| Pore Velocities (m/s) | H = 5.0 g/Kg | H = 11 g/Kg | H = 17.0 g/Kg |
|---|---|---|---|
| 0.07 | 0.94 to 0.97 | 0.92 to 0.99 | 0.90 to 0.97 |
| 0.14 | 0.94 to 0.97 | 0.92 to 0.97 | 0.91 to 0.97 |
| 0.28 | 0.96 to 0.98 | 0.92 to 0.96 | 0.94 to 0.98 |

Figure 16:
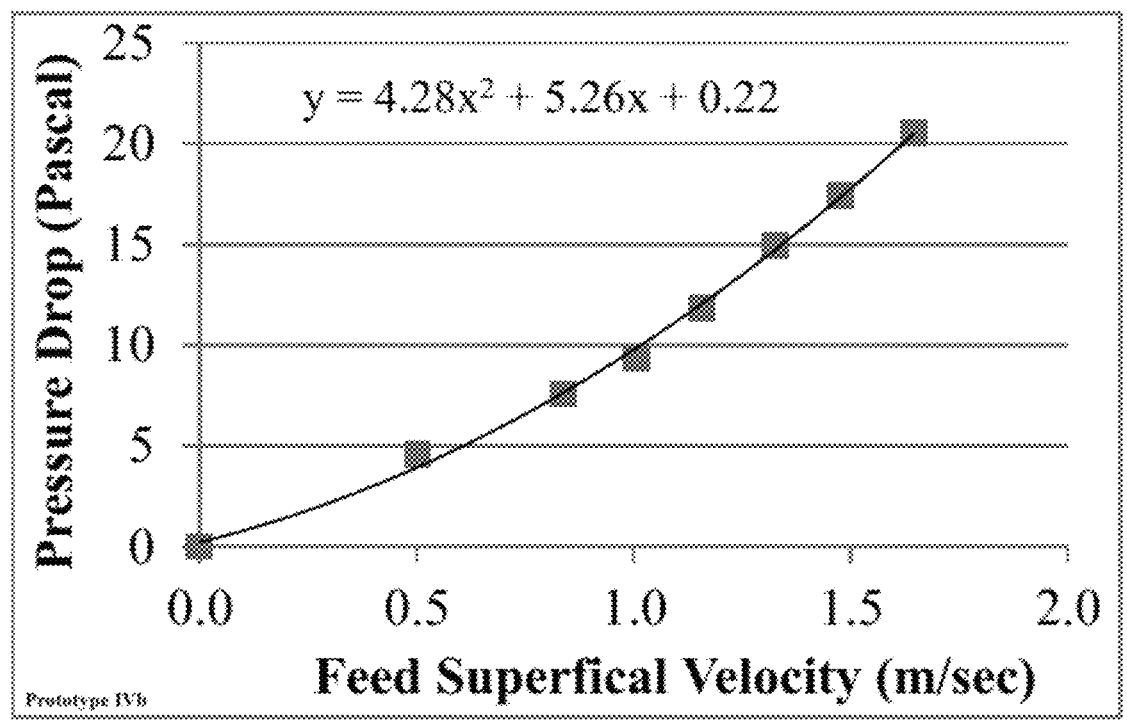
FIG. 16 is a graph that shows feed to Retentate of Prototype IVb as a function of feed velocity. The data indicate that IIIb and IVb can meet feed/retentate design specifications (<60 Pa).

FIG. 16 shows example IVb, a larger scale version of IIIb, designed to go into a 12"×6" (0.30 m×0.15 m) or larger air conditioning duct. It was installed it in a 12"×12" (0.30 m×0.30 m) duct and measured the pressure drop through the Feed/Retentate portion of the module for various superficial velocities. FIG. 16 is the result of these pressure drop tests. The feed/retentate pressure drop vs superficial velocity has a polynomial fit with a value of 0.020 kPa (0.15 mmHg) at 1.6 m/sec, which is well below the 0.45 mmHg or 0.06 kPa design specification. IVb, like IIIb, had 34 membrane layers. The pressure drop for each layer, at a superficial velocity of 1.6 m/s, was 0.60 Pa ($6.0 \times 10^{-4}$ kPa). Kneifel et al.'s hollow-fiber membrane humidity absorber module had a pressure drop per layer of 1.5 Pa for a superficial velocity of 1.6 m/s [18]; their void space was 0.67 compared to Prototype IVb's 0.74.

Pressure drop in the sweep to permeate channels is an important design factor that impacts the vacuum pump work and overall driving force for mass transport. Tables 3 and 4 contain the pressure drop data organized by Sweep Rate and Average Sweep/Permeate Pressures for II and IIIb, respectively. The sweep rates in the two tables is the total flow rate sent to the vacuum pump and included the air flow through the rotameter, water vapor fluxed through the membranes, and the amount leaked through imperfections in module construction. The listed "Average Pressures" is the average of the sweep in and permeate (sweep out) pressures. The tables also contain the sweep/permeate pressure drops, exit permeate pressures, exit fluid velocities, Reynolds and Grashof numbers for the sweep/permeate flows.

TABLE 3

Prototype II Sweep Pressures, Pressure Drops through Sweep Channels and Permeate Exit Pressures in mmHg-abs. 240 total fibers, 0.394 meters long

| Sweep Rate (SLPM) | Average Pressure | Sweep Pressure Drop | Permeate Exit Pressure | Exit Velocity (m/s) | Re # | Gr # |
|---|---|---|---|---|---|---|
| 0.51 | 72 | 75 | 34 | 9.4 | 9.4 | 0.004 |
| 0.81 | 94 | 101 | 44 | 12 | 15 | 0.007 |
| 1.11 | 110 | 118 | 51 | 14 | 20 | 0.010 |
| 1.91 | 146 | 148 | 72 | 17 | 35 | 0.017 |
| 2.81 | 176 | 175 | 89 | 20 | 52 | 0.025 |

TABLE 4

Prototype IIIb Sweep Pressures, Pressure Drops through Sweep Channels and Permeate Exit Pressures in mmHg-abs. 1020 total fibers, 0.152 meters long

| Sweep Rate (SLPM) | Average Pressure | Sweep Pressure Drop | Permeate Exit Pressure | Exit Velocity (m/s) | Re # | Gr # |
|---|---|---|---|---|---|---|
| 1.1 | 100 | 23 | 89 | 1.8 | 4.8 | 0.006 |
| 1.4 | 110 | 27 | 96 | 2.2 | 6.1 | 0.007 |

TABLE 4-continued

Prototype IIIb Sweep Pressures, Pressure Drops through Sweep
Channels and Permeate Exit Pressures in mmHg-abs. 1020 total
fibers, 0.152 meters long

| Sweep Rate (SLPM) | Average Pressure | Sweep Pressure Drop | Permeate Exit Pressure | Exit Velocity (m/s) | Re # | Gr # |
|---|---|---|---|---|---|---|
| 1.7 | 120 | 29 | 106 | 2.4 | 7.4 | 0.009 |
| 2.5 | 140 | 35 | 123 | 3.0 | 11 | 0.013 |
| 3.4 | 164 | 42 | 143 | 3.5 | 15 | 0.018 |

To evaluate the information in Tables 3 and 4 consider the common sweep rate of 1.1 SLPM produced similar average pressures in the sweep/permeate chambers (110 vs. 100 mm-Hg). At 1.1 SLPM, IIIb had the smallest pressure drops (23 mm-Hg vs. 118 mm-Hg) because IIIb had shorter sweep/permeate channel lengths (0.152 m vs. 0.394 m) and smaller exit velocities (1.8 vs. 14 m/s). This specific example is represented of all of the data with respect to the sweep/permeate pressure drop design factor. Specifically, IIIb performed better than comparative example II producing smaller pressure drops. In addition, for the similar sweep rates IIIb produced lower averaged sweep/permeate pressures at lower required compression ratios for the vacuum pump (higher permeate exit pressures). In other words, IIIb produced superior driving forces at lower pump work.

Table 5 summarizes the results for II IIIb, calculated for the specific feed conditions of 0.3 m/s pore velocities, 0.011 g/Kg-DA absolute humidity using sweep/feed ratios of 2.0% for II and 2.5% for IIIb. Even though IIIb used the less efficient cross-current configuration, its greater $k^c_{feed}$ and lower sweep/permeate pressure drops ($\approx$70% lower) still produced superior and unexpected overall module water-vapor permeances (4700 vs. 1700 GPUs). In addition to the greater $k^c_{feed}$ and lower sweep/permeate pressure drops, the design's driving force configuration correction resulted in driving forces close to the preferred counter-current configuration.

TABLE 5

Mass Transport Properties and Results for ARI 80/67 Absolute humidity feeds (11 g/Kg-DA),
Pore Velocity of 0.3 m/sec. Sweep rates: for Prototype II = 2.0% and Prototype IIIb = 2.5%.

| | | Functional | | Humidity | Process Efficiency | |
|---|---|---|---|---|---|---|
| Prototype | Configuration | Module Permeance, $K_o$ (GPU) | Power of $1/K_o$ on Pore Velocity | Absolute Humidity Reduction (%) | Removal Rate (mol/m² hr) | Coefficient of Dehumid. (CDP) | $\eta_{sep}$ |
| II | Counter-current | 1700 | −0.8 | 12 | 2.9 | 0.45 | 10% |
| IIIb | Cross-current | 4700 | −1.0 | 26 | 5.6 | 1.15 | 25% |

To summarize the results, one of ordinary skill in the art would note the superior and unexpected results of example IIIb, including in the important areas of module permeances, absolute humidity reduction, and process efficiency.

Embodiments of the present invention were also found to be superior compared to membrane modules for high pressure feed gas drying operations. The following are some of the specific differences in the VSD membrane module: lower membrane densities to meet the specification for very low pressure drops in the feed/retentate stream (<0.060 kPa); hollow fiber configuration with the feed/retentate stream flowing outside and across the membranes counter to conventional high pressure gas drying modules that have the feed/retentate stream flowing inside of the hollow fiber; cross-current sweep flow instead of counter-current sweep flows for pressure gas drying; and sweep to feed ratios be ≤5% instead of the recommend 5-10% ratios for high pressure gas drying.

Additionally, one of ordinary skill in the art would understand that high pressure gas drying membranes modules would not be a suitable alternative for the present invention at least because they have tightly packed hollow fibers with feeds entering the tube lumens and sweeps flowing outside the membranes fibers in the shell side. These models will not be suitable for VSD because of the pressure drops produced with the feed to retentate flow down the hollow fiber lumens. The pressure drops produced in these existing modules are negligible when the feed pressures are greater than 5 bars but would be intolerable for feed pressures of approximately one bar present in air conditioning ducts. Repurposing the existing high pressure modules by switching the feed to the shell side and the sweep to the lumen would result in excessive maldistribution of the feed around the membranes due to the tightly packed hollow fibers. Also, the small I.D. combined with the standard gas drying module lengths (greater than 0.35 m) would produce inefficient pressure drops in the sweep to permeate stream. Difficulties in stream pressure drops would, also, occur by trying to repurpose other existing membrane modules such as spiral wound modules used for gas drying.

The invention thus being described, and as discussed above, it will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the Specification, including the disclosed embodiments, tests, data, and examples, be considered as exemplary only, and not intended to limit the scope and spirit of the invention.

Additional Terms and Nomenclature

ASHRAE: American Society of Heating, Refrigeration, and Air Conditioning Engineers Dry Bulb Temperature: The temperature of air measured directly by a thermometer.

Expansion Valve: Any throttling device, such as, but not limited to, a valve, capillary tube, throttle, or an orifice.

g/kg-DA: A humidity unit notation meaning grams of water vapor per kg of dry air.

Humidity: A measure of the amount of water vapor in the air stream.

Humidity Control: A process to actively control both the sensible heat and the latent heat of a space or air mass to a range of dry bulb and wet bulb temperatures. Both of these temperatures are measured and the process adjusted to achieve both desired ranges.

Latent Heat: The energy added to or removed from an air mass by increasing or decreasing the humidity in the air mass.

Relative Humidity: Quantifies the amount of water vapor in the air as a percentage of the maximum amount of water vapor air can hold at the Dry Bulb Temperature of the air.

Sensible Heat: The energy added to or removed from an air mass to change the Dry Bulb Temperature VCC: Vapor Compression (refrigeration) Cycle

REFERENCES

Throughout this application various publications are referenced. All such references, including those listed below, are incorporated herein by reference.
1. *Condensing dryers with enhanced dehumidification using surface tension elements.* Cochran, Michael, et al. 2009, Applied Thermal Engineering, pp. 723-731.
2. *Air Products, Inc. CACTUS® membrane air dryers.* s.l.: http://www.airproducts.com/Products/Equipment/PRISMMembranes/page03.htm, 2010. Product Literature.
3. *Separations research needs for the 21st century.* Noble, R. and Agrawal, R. 9, 2005, Industrial and Engineering Chemistry Research, Vol. 44, pp. 2887-2892.
4. *P(AA-AMPS)-PVA/polysulfone composite hollow fiber membranes for propylene dehumidification.* Pan, F., et al. 2008, Journal of Membrane Science, Vol. 323, pp. 395-403.
5. *Flue gas dehydration using polymer membranes.* Sijbesma, H., et al. 2008, Journal of membrane science, Vol. 313, pp. 263-276.
6. *Testing and evaluation of room temperature ionic liquid (RTIL) membranes for gas dehumidification.* Scovazzo, Paul. 2010, Journal of Membrane Science, Vol. 355, pp. 7-17.
7. *A novel air conditioning system, membrane air drying and evaporative cooling.* El-Dessouky, H. T., Ettounkey, H. M. and Bouhamra, W. 2000, Trans IChemE, Vol. 78, pp. 999-1009.
8. *The effect of a support layer on the permeability of water vapor in asymmetric composite membranes.* Liu, L., et al. 2001, Separation Science and Technology, Vol. 36, pp. 3701-3720.
9. *Performance of a membrane-based condensate-recovery heat exchanger.* Newbold, D. D., et al. Monterey, Calif.: SAE Technical Paper Series, 1996. 26th International Conference on Environmental Systems. p. SAE Technical Paper 961356.
10. *Hollow fiber membrane contactor for air humidity control: Modules and membranes.* Kneifel, K., et al. 2006, Journal of Membrane Science, Vol. 276, pp. 241-251.
11. *Enhanced dehumidification performance of PVA membranes by tuning the water state through incorporating organophosphorus acid.* Pan, F., et al. 2008, Journal of Membrane Science, Vol. 325, pp. 727-734.
12. Perry's Handbook of Chemical Engineering, 8th edition. [book auth.] Perry's. *Transport and storage of fluids.* New York: McGraw Hill, 2008, pp. 10-58 to 10-60.
13. *Separation of gases by diffusion and gaseous permeation—Applications of gaseous permeation to the dehdration of national gas.* Charpin, J. 1990, Revue Roumaine de Chimie, Vol. 35, pp. 815-820.
14. *Interactions of polyether-polyurethanes with water vapour and water-methane separation selectivity.* Di Landro, L., Pegoraro, M. and Bordogna, L. 1991, Journal of Membrane Science, Vol. 64, pp. 229-236.
15. *Solubility and transport of water vapor in some 6FDA-based polyimides.* Lokhandwala, K. A., Nakakatti, S. M. and Stern, S. A. 1995, Journal of Polymer Science, Part B: Poly Phys., Vol. 33, pp. 965-976.
16. *Polymeric membranes for natural gas conditioning.* Feng, H., Zhang, H. and Xu, L. 2007, Energy Sources, Part A, Vol. 29, p. 1269.
17. *Membrane porosity and hydrophilic membrane-based dehumidification performance.* Scovazzo, Paul, Hoehn, Alex and Todd, Paul. 2000, Journal of Membrane Science, Vol. 167, pp. 217-225.

What is claimed is:

1. An apparatus for removing water vapor from gas, comprising:
   a membrane housing;
   a membrane received by the housing, the membrane comprising a stack of membrane layers having at least six membrane layers, wherein intramembrane fractional spacing of open flow area to total area of the membrane is about 0.5 or greater;
   a feed gas inlet that is upstream from the membrane and directs a feed gas at ambient pressure to perpendicularly contact and cross the membrane;
   a feed gas outlet downstream of the membrane, where the feed gas has a pressure drop from the feed gas inlet to the feed gas outlet of less than 0.06 kPa;
   a sweep gas inlet extending along the stack of membrane layers, the sweep gas inlet directing a sweep gas through and/or across the membrane;
   a sweep gas outlet extending along the stack of membrane layers, the sweep gas outlet allowing the sweep gas to exit the membrane housing, each membrane layer extending between the sweep gas inlet and sweep gas outlet; and
   wherein water vapor from the feed gas is drawn through and/or across the membrane and out of the membrane housing.

2. The apparatus of claim 1, wherein each membrane layer of the membrane is comprised of hollow fibers and the sweep gas is directed through the hollow fibers.

3. The apparatus of claim 2, wherein the hollow fibers have a diameter of about 0.5 mm to about 5 mm.

4. The apparatus of claim 1, wherein the membrane is a hollow fiber membrane, capillary membrane, flat sheet membrane, or a combination thereof.

5. The apparatus of claim 1, wherein the intramembrane fractional spacing is from about 0.5 to about 0.75.

6. The apparatus of claim 1, wherein the membrane housing is situated inside a HVAC air duct.

7. The apparatus of claim 1, wherein the membrane comprises at least 24 membrane layers.

8. The apparatus of claim 1, further comprising a recycle loop that is in fluid communication with the sweep gas outlet and the feed gas inlet.

9. The apparatus of claim 1, wherein the sweep gas has a pressure drop from the sweep gas inlet to the sweep gas outlet of less than 40 mmHg.

10. An apparatus for removing water vapor from gas, comprising:
    a membrane housing having a feed gas end and a retentate end, the membrane housing comprising:

a sweep in manifold,
a sweep out manifold,
a membrane comprising at least six membrane layers stacked along a length of the sweep in manifold and the sweep out manifold, each membrane layer comprising hollow fibers distributed across a width of the membrane layer and coupled between the sweep in manifold and the sweep out manifold, wherein intramembrane fractional spacing of open flow area to total area of the membrane is about 0.5 or greater,
a feed gas pressure zone,
a sweep gas in pressure zone, and
a sweep gas out pressure zone;
wherein the sweep in manifold and the sweep out manifold are parallel to a feed gas flow and hold the hollow fibers of the at least six membrane layers perpendicular to the feed gas flow; and
wherein the sweep in manifold defines the sweep gas in pressure zone and the feed gas pressure zone and the sweep out manifold defines the sweep gas out pressure zone and the feed gas pressure zone;
a feed gas inlet directing a feed gas with a first humidity through the feed gas pressure zone to perpendicularly contact and cross the membrane to the retentate end, wherein the feed gas enters a first pressure space at ambient pressure with a pressure drop across the feed gas pressure zone of less than 0.06 kPa;
a feed gas outlet on the retentate end;
a sweep gas inlet directing a sweep gas with a second humidity into the sweep gas in pressure zone, through the membrane, and to the sweep gas out pressure zone;
a sweep gas outlet in the sweep gas out pressure zone, allowing permeate to exit the membrane housing; and
wherein water vapor from the feed gas is drawn through the membrane into a second pressure space as the permeate.

11. The apparatus of claim 10, further comprising:
a sweep gas flow regulator to direct the sweep gas into the sweep gas in pressure zone; and
a sweep gas outlet vacuum pump located downstream from the sweep gas outlet that imparts a lower pressure in the sweep gas out pressure zone than the pressure in the sweep gas in pressure zone and the feed gas pressure zone.

12. The apparatus of claim 11, wherein the sweep gas flow regulator is an expansion valve, a throttling device, a valve, a capillary tube, or an orifice.

13. The apparatus of claim 10, further comprising a flow splitter to direct a re-directed portion of the feed gas exiting the first pressure space to the second pressure space as the sweep gas.

14. The apparatus of claim 10, further comprising a water collection device to collect condensed water vapor from the feed gas.

15. The apparatus of claim 10, wherein the intramembrane fractional spacing is from about 0.5 to about 0.75.

16. The apparatus of claim 10, wherein the membrane is comprised of hollow fibers with a diameter of about 0.5 mm to about 5 mm.

17. The apparatus of claim 10, wherein the membrane comprises polydimethylsiloxane, cellulose acetate, sulfonated polyethersulfone, polyethylene oxide, sulfonated poly(ether ether ketone), poly(vinylalcohol)-Ethylene Diamine Tetra (Methylene Phosphonic Acid), 1-ethyl-3-methylimidazolium bis(trifluoromethylsulfonyl)amide, trimethyl(butyl)ammonium bis(trifluoromethylsulfonyl)amide, 1-ethyl-3-methylimidazolium ($BF_4$), or combinations thereof.

18. The apparatus of claim 10, further comprising a recycle loop that is in fluid communication with the sweep gas outlet and the feed gas inlet.

19. The apparatus of claim 10, wherein the sweep gas comprises a portion of the feed gas.

20. The apparatus of claim 10, wherein the feed gas is air, oxygen, nitrogen, methane, biomethane, ethane, ethylene, ethanol, butane, butanol, or combinations thereof.

21. The apparatus of claim 10, being part of an air conditioning system.

22. The apparatus of claim 10, wherein fiber density is about 4 fibers per cm for a cross-sectional void space of 74%.

23. The apparatus of claim 10, wherein the membrane comprises at least 24 membrane layers.

24. The apparatus of claim 10, wherein the sweep gas has a pressure drop from the sweep gas in pressure zone to the sweep gas out pressure zone of less than 40 mmHg.

* * * * *